United States Patent
Zhang et al.

(10) Patent No.: US 10,448,443 B2
(45) Date of Patent: Oct. 15, 2019

(54) EFFICIENT TRANSITION BETWEEN A TRUSTED WLAN AND A WWAN

(71) Applicant: QUALCOMM Incorporated, San Diego, CA (US)

(72) Inventors: Juan Zhang, San Diego, CA (US); Ajith Tom Payyappilly, San Diego, CA (US); Arvind Vardarajan Santhanam, San Diego, CA (US); Suli Zhao, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 15/217,047

(22) Filed: Jul. 22, 2016

(65) Prior Publication Data
US 2017/0265239 A1    Sep. 14, 2017

Related U.S. Application Data

(60) Provisional application No. 62/306,053, filed on Mar. 9, 2016.

(51) Int. Cl.
*H04W 76/00*    (2018.01)
*H04L 29/06*    (2006.01)
(Continued)

(52) U.S. Cl.
CPC ......... *H04W 76/15* (2018.02); *H04L 65/1016* (2013.01); *H04W 12/08* (2013.01);
(Continued)

(58) Field of Classification Search
CPC ... H04W 76/025; H04W 12/08; H04W 76/06; H04W 48/18; H04W 84/12; H04L 65/1016
See application file for complete search history.

(56) References Cited

U.S. PATENT DOCUMENTS 9,668,236 B2 *  5/2017  Ryu ..................... H04W 68/02
9,820,187 B2 * 11/2017  Sirotkin ............... H04W 28/08
(Continued)

FOREIGN PATENT DOCUMENTS

CN         103634941 A     3/2014
WO     WO2015062643 A1    5/2015
(Continued)

OTHER PUBLICATIONS

ISA/EP, International Search Report and Written Opinion of the International Searching Authority, Int'l Application No. PCT/US2017/019363, Aug. 3, 2017, European Patent Office, Rijswijk, NL, 25 pgs.

(Continued)

*Primary Examiner* — Shailendra Kumar
(74) *Attorney, Agent, or Firm* — Holland & Hart LLP

(57) ABSTRACT

Methods, systems, and devices for wireless communication are described. A user equipment (UE) may prevent rejected attachment requests when connecting to a trusted wireless local area network (WLAN) and from a wireless wide area network (WWAN). For example, an attachment packet data network (PDN) connection may be maintained with the WWAN while connected to the trusted WLAN. In some cases, the connection used to maintain the attachment may be an internet protocol (IP) multimedia subsystem (IMS) connection. Alternatively, the UE may determine that the WLAN connection is a trusted connection and deactivate the WWAN connection. Should the WLAN become unavailable the UE may reactivate the connection with the WWAN.

17 Claims, 19 Drawing Sheets

(51) Int. Cl.
  *H04W 48/18* (2009.01)
  *H04W 12/08* (2009.01)
  *H04W 76/15* (2018.01)
  *H04W 76/30* (2018.01)
  *H04W 36/00* (2009.01)
  *H04W 84/12* (2009.01)
  *H04W 88/06* (2009.01)

(52) U.S. Cl.
  CPC ....... *H04W 36/0022* (2013.01); *H04W 48/18* (2013.01); *H04W 76/30* (2018.02); *H04W 84/12* (2013.01); *H04W 88/06* (2013.01)

(56) References Cited

U.S. PATENT DOCUMENTS

| | | | | |
|---|---|---|---|---|
| 2013/0229270 A1* | 9/2013 | Srinivasan | ............ | H04W 36/18 340/328 |
| 2014/0010221 A1* | 1/2014 | Panian | ................. | H04W 76/10 370/338 |
| 2014/0086226 A1* | 3/2014 | Zhao | .................... | H04W 76/12 370/338 |
| 2015/0092553 A1* | 4/2015 | Sirotkin | ............... | H04W 48/16 370/235 |
| 2015/0257066 A1* | 9/2015 | Salkintzis | ............ | H04W 12/06 455/442 |
| 2015/0327129 A1* | 11/2015 | Faccin | ............. | H04W 36/0055 370/331 |
| 2015/0334622 A1* | 11/2015 | Baboescu | ............ | H04W 36/14 370/331 |
| 2015/0373608 A1 | 12/2015 | Zhu et al. | | |
| 2016/0080981 A1 | 3/2016 | Wang et al. | | |
| 2016/0080995 A1 | 3/2016 | Singh et al. | | |
| 2016/0127964 A1* | 5/2016 | Roeland | ................ | H04W 36/14 370/332 |
| 2017/0118787 A1* | 4/2017 | Kekki | ................. | H04W 76/025 |

FOREIGN PATENT DOCUMENTS

| WO | WO-2015103596 A1 | 7/2015 |
|---|---|---|
| WO | WO-2015150875 A1 | 10/2015 |

OTHER PUBLICATIONS

ISA/EPO, Partial International Search Report of the International Searching Authority, Int'l App. No. PCT/US2017/019363, May 4, 2017, European Patent Office, Rijswijk, NL, 15 pgs.

* cited by examiner

EFFICIENT TRANSITION BETWEEN A TRUSTED WLAN AND A WWAN

CROSS REFERENCES

The present application for patent claims priority to U.S. Provisional Patent Application No. 62/306,053 by Zhang, et al., entitled "EFFICIENT TRANSITION BETWEEN A TRUSTED WLAN AND A WWAN," filed Mar. 9, 2016, assigned to the assignee hereof.

BACKGROUND

The following relates generally to wireless communication, and more specifically to efficient transition between a trusted wireless local area network (WLAN) and a wireless wide area network (WWAN).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE). A wireless network may also include components of a WLAN, such as a Wi-Fi (i.e., IEEE 802.11) network, and may include access points (APs) that may communicate with at least one UE or station (STA).

In some cases, when a UE is located in the coverage area of both a WWAN and WLAN, certain packet data network (PDN) connections may be switched between these networks (i.e., an internet PDN or an internet protocol (IP) multimedia subsystem (IMS) PDN). For example, a UE may initially be associated with a WWAN and transition to a WLAN for communication and subsequently disconnect from the WWAN. However, in some cases a device connected to a trusted WLAN may continue to try to attach to the WWAN. The WWAN network may reject the attachment, which may trigger a timeout delay. If the UE leaves the coverage area of the WLAN, the UE may not be able to immediately reconnect to the WWAN, which may result in a disruption of delay in the communications of the user.

SUMMARY

A user equipment (UE) may prevent rejected attachment requests when connecting to a trusted wireless local area network (WLAN) and from a wireless wide area network (WWAN). For example, an attachment packet data network (PDN) connection may be maintained with the WWAN while connected to the trusted WLAN. In some cases, the connection used to maintain the attachment may be an internet protocol (IP) multimedia subsystem (IMS) connection. Alternatively, the UE may determine that the WLAN connection is a trusted connection and deactivate the WWAN connection. Should the WLAN become unavailable the UE may reactivate the connection with the WWAN.

A method of wireless communication is described. The method may include establishing a connection with a wireless local area network (WLAN), disconnecting a first packet data network (PDN) connection with a wireless wide area network (WWAN) based at least in part on the established connection with the WLAN, maintaining a second PDN connection with the WWAN while connected to the WLAN, determining that the connection with the WLAN is unavailable and establishing a third PDN connection with the WWAN based at least in part on the second PDN connection.

An apparatus for wireless communication is described. The apparatus may include means for establishing a connection with a wireless local area network (WLAN), means for disconnecting a first packet data network (PDN) connection with a wireless wide area network (WWAN) based at least in part on the established connection with the WLAN, means for maintaining a second PDN connection with the WWAN while connected to the WLAN, means for determining that the connection with the WLAN is unavailable and means for establishing a third PDN connection with the WWAN based at least in part on the second PDN connection.

A further apparatus is described. The apparatus may include a processor, memory in electronic communication with the processor, and instructions stored in the memory. The instructions may be operable to cause the processor to establish a connection with a wireless local area network (WLAN), disconnect a first packet data network (PDN) connection with a wireless wide area network (WWAN) based at least in part on the established connection with the WLAN, maintain a second PDN connection with the WWAN while connected to the WLAN, determine that the connection with the WLAN is unavailable and establish a third PDN connection with the WWAN based at least in part on the second PDN connection.

A non-transitory computer readable medium for wireless communication is described. The non-transitory computer-readable medium may include instructions to cause a processor to establish a connection with a wireless local area network (WLAN), disconnect a first packet data network (PDN) connection with a wireless wide area network (WWAN) based on the established connection with the WLAN, maintain a second PDN connection with the WWAN while connected to the WLAN, determine that the connection with the WLAN is unavailable and establish a third PDN connection with the WWAN based on the second PDN connection.

In some examples of the method, apparatus, or non-transitory computer-readable medium described above, the second PDN connection comprises an attachment PDN that terminates at a WWAN network entity. In some examples of the method, apparatus, or non-transitory computer-readable medium described above, the second PDN connection comprises an internet protocol (IP) multimedia subsystem (IMS) connection.

Some examples of the method, apparatus, or non-transitory computer-readable medium described above may further include processes, features, means, or instructions for refraining from establishing the IMS connection with the WLAN based on the second PDN connection. Some examples of the method, apparatus, or non-transitory computer-readable medium described above may further include processes, features, means, or instructions for communicating using the IMS connection over the WWAN while connected to the WLAN.

Some examples of the method, apparatus, or non-transitory computer-readable medium described above may further include processes, features, means, or instructions for receiving a release request from the WWAN based on the connection with the WLAN, where disconnecting the first PDN connection is based on the detach request. Some examples of the method, apparatus, or non-transitory computer-readable medium described above may further include processes, features, means, or instructions for refraining from performing an attachment procedure with the WWAN based on the second PDN connection.

A method of wireless communication is described. The method may include determining that a connection with a wireless local area network (WLAN) comprises a trusted connection, deactivating a connection with the WWAN based at least in part on the determination that the connection with the WLAN is a trusted connection and refraining from performing an attachment procedure with the WWAN based at least in part on deactivating the connection with the WWAN.

An apparatus for wireless communication is described. The apparatus may include means for determining that a connection with a wireless local area network (WLAN) comprises a trusted connection, means for deactivating a connection with the WWAN based at least in part on the determination that the connection with the WLAN is a trusted connection and means for refraining from performing an attachment procedure with the WWAN based at least in part on deactivating the connection with the WWAN.

A further apparatus is described. The apparatus may include a processor, memory in electronic communication with the processor, and instructions stored in the memory. The instructions may be operable to cause the processor to determine that a connection with a wireless local area network (WLAN) comprises a trusted connection, deactivate a connection with the WWAN based at least in part on the determination that the connection with the WLAN is a trusted connection and refrain from performing an attachment procedure with the WWAN based at least in part on deactivating the connection with the WWAN.

A non-transitory computer readable medium for wireless communication is described. The non-transitory computer-readable medium may include instructions to cause a processor to determine that a connection with a wireless local area network (WLAN) comprises a trusted connection, deactivate a connection with the WWAN based on the determination that the connection with the WLAN is a trusted connection and refrain from performing an attachment procedure with the WWAN based on deactivating the connection with the WWAN.

Some examples of the method, apparatus, or non-transitory computer-readable medium described above may further include processes, features, means, or instructions for determining that the connection with the WLAN is a trusted connection is based on an internet protocol (IP) address assigned by the WLAN, a service set identifier (SSID) of the WLAN, an authentication mode of the WLAN, or any combination thereof.

In some examples of the method, apparatus, or non-transitory computer-readable medium described above, deactivating the connection to the WWAN comprises: entering a circuit switch (CS) only mode, disabling a communication mode of the WWAN, initiating a limited service mode, or any combination thereof.

Some examples of the method, apparatus, or non-transitory computer-readable medium described above may further include processes, features, means, or instructions for determining that the connection with the WLAN is unavailable. Some examples of the method, apparatus, or non-transitory computer-readable medium described above may further include processes, features, means, or instructions for reactivating the connection with the WWAN based on the determination that the connection with the WLAN is unavailable.

Some examples of the method, apparatus, or non-transitory computer-readable medium described above may further include processes, features, means, or instructions for receiving a detach request from the WWAN based on the connection with the WLAN.

A method of wireless communication is described. The method may include establishing a first packet data network (PDN) connection with a user equipment (UE) over a wireless wide area network (WWAN), establishing a second PDN connection with the UE over the WWAN, establishing a third PDN connection with the UE over a trusted wireless local area network (WLAN), disconnecting the first PDN connection with the UE based at least in part on the third PDN connection and maintaining the second PDN connection while connected to the UE with the third PDN connection.

An apparatus for wireless communication is described. The apparatus may include means for establishing a first packet data network (PDN) connection with a user equipment (UE) over a wireless wide area network (WWAN), means for establishing a second PDN connection with the UE over the WWAN, means for establishing a third PDN connection with the UE over a trusted wireless local area network (WLAN), means for disconnecting the first PDN connection with the UE based at least in part on the third PDN connection and means for maintaining the second PDN connection while connected to the UE with the third PDN connection.

A further apparatus is described. The apparatus may include a processor, memory in electronic communication with the processor, and instructions stored in the memory. The instructions may be operable to cause the processor to establish a first packet data network (PDN) connection with a user equipment (UE) over a wireless wide area network (WWAN), establish a second PDN connection with the UE over the WWAN, establish a third PDN connection with the UE over a trusted wireless local area network (WLAN), disconnect the first PDN connection with the UE based at least in part on the third PDN connection and maintain the second PDN connection while connected to the UE with the third PDN connection.

A non-transitory computer readable medium for wireless communication is described. The non-transitory computer-readable medium may include instructions to cause a processor to establish a first packet data network (PDN) connection with a user equipment (UE) over a wireless wide area network (WWAN), establish a second PDN connection with the UE over the WWAN, establish a third PDN connection with the UE over a trusted wireless local area network (WLAN), disconnect the first PDN connection with the UE based on the third PDN connection and maintain the second PDN connection while connected to the UE with the third PDN connection.

In some examples of the method, apparatus, or non-transitory computer-readable medium described above, the second PDN connection comprises an attachment PDN that terminates at a WWAN network entity. In some examples of the method, apparatus, or non-transitory computer-readable medium described above, the second PDN connection comprises an internet protocol (IP) multimedia subsystem (IMS) connection.

Some examples of the method, apparatus, or non-transitory computer-readable medium described above may further include processes, features, means, or instructions for transmitting a release request to the UE for the first PDN connection based on the third PDN connection with the trusted WLAN. Some examples of the method, apparatus, or non-transitory computer-readable medium described above may further include processes, features, means, or instructions for establishing a fourth PDN connection over the WWAN with the UE based on the second PDN connection.

DETAILED DESCRIPTION

Figure 1:
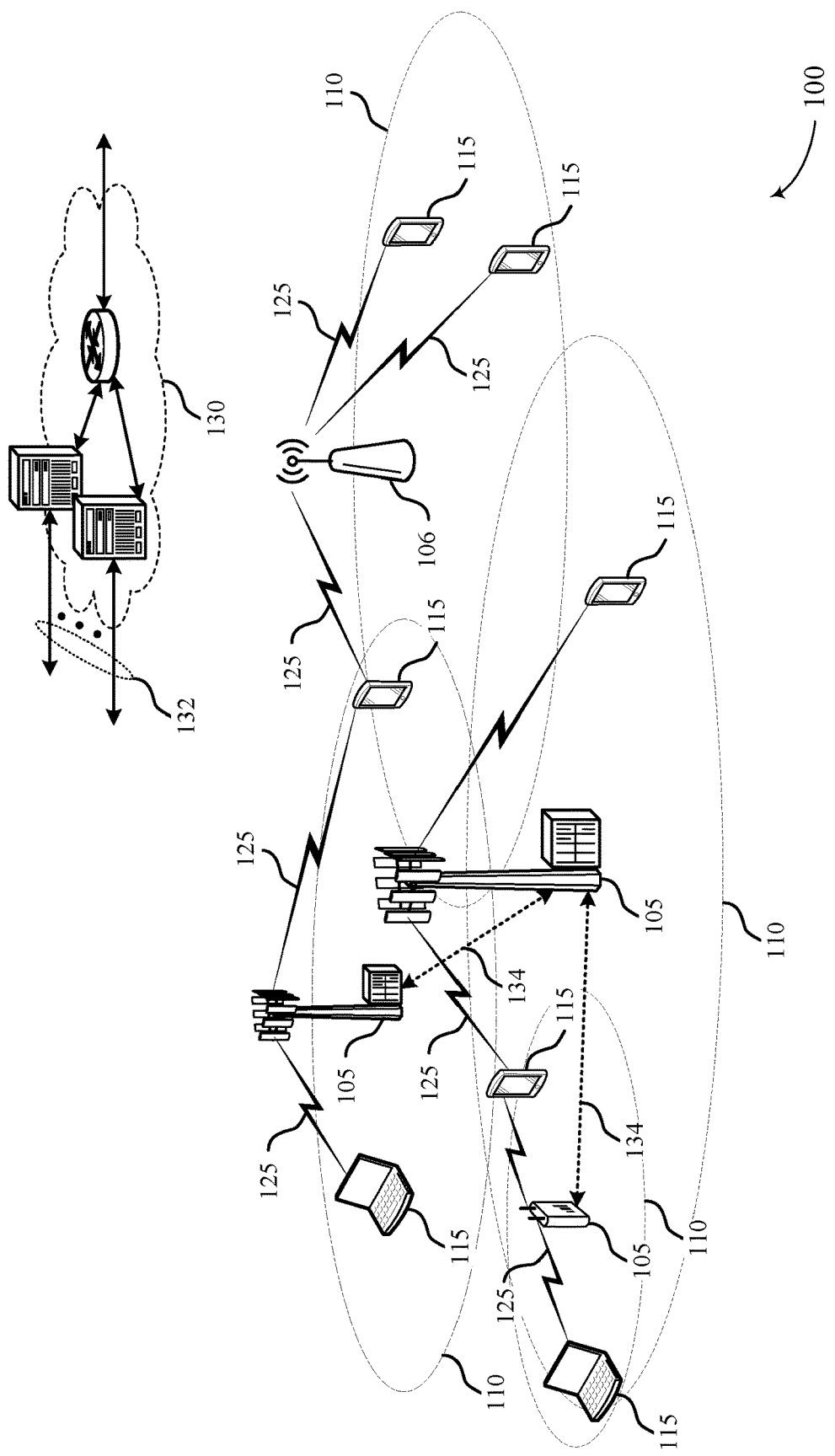
FIG. 1 illustrates an example of a wireless communications system that supports efficient transition between a trusted wireless local area network (WLAN) and a wireless wide area network (WWAN) in accordance with aspects of the present disclosure.

In some wireless communications systems, an operator of a wireless network may enable user equipments (UEs) to dynamically communicate using different radio access technologies (RATs). By allowing a UE to transition from one RAT to another, an operator may mitigate bandwidth usage to improve overall communication efficiency and throughput. For example, a UE may initially communicate over a wireless wide area network (WWAN), such as a Long Term Evolution (LTE)/LTE-Advanced (LTE-A) network, and the operator may enable the UE to transition or offload to a wireless local area network (WLAN) to improve bandwidth availability in the WWAN. When the UE leaves the coverage area of the WLAN communication may resume on the WWAN.

If a UE is located within a WWAN coverage area while communicating over a WLAN, the UE may remain attached to the WWAN via a packet data network (PDN) connection. If the UE moves out of the WLAN coverage area and needs to communicate data via the WWAN again, delays in attaching to WWAN may be avoided due to the maintained connection. However, with some network configuration a UE may be connected to a WLAN and simultaneously located within a WWAN coverage area, but unable to remain attached to the WWAN. That is, based on a limited number of connections possible through a PDN gateway (PGW), the WWAN may send a detach request to the UE shortly after being connected to WLAN. Due to independent operation of a UE's WLAN and WWAN components, this detachment may lead to various communications disruptions and delays should the UE attempt to transition back to the WWAN.

In some cases, a network may be configured to eliminate communication delays when transitioning between a trusted WLAN and a WWAN. For example, a UE and network may be configured to establish an attachment PDN connection (e.g., a "dummy" PDN), where the attachment PDN connection may not be used to transfer any traffic. The attachment PDN connection may be used as an initial attachment PDN for WWAN use by a UE's WWAN modem. In some cases, the UE's high level operating system (HLOS) may be unaware of the attachment PDN connection and may continue to use a PDN connection with the WLAN for communications.

In some cases, a network using trusted WLANs may assign the same IP address to the UE when using both WWAN and WLAN. Thus, when connecting to a WLAN using the same IP address, the UE may assume that the WLAN can be a trusted WLAN. A UE may be enabled to determine or assume the connection with a trusted WLAN by provisioning the UE with a list of service set identifiers (SSIDs) used by the operator that are indicated as trusted WLAN SSIDs. Based on the determination of the trusted WLAN, the UE may subsequently refrain from trying to attach to the WWAN by itself (e.g., by either going into circuit switched (CS) only mode or disabling WWAN mode). Thus, the assumption made by the UE may prevent a situation where the network bars the UE for a backoff time period (as discussed above) and delays in communications may be avoided.

In some examples, a UE may make an assumption when it identifies the same IP address on WLAN that it is a trusted WLAN network and subsequently avoid attempting to attach to the WWAN with a PDN connection. As mentioned above, the determination of trusted WLAN may be accomplished by provisioning the UE with a list of SSIDs by the operator that are associated with trusted WLANs. The UE may then retain an IP multimedia subsystem (IMS) connection on the WWAN and may refrain from communication with IMS via the WLAN. As a result the user may continue service with minimal or no interruption when transitioning from the WLAN to a WWAN.

Aspects of the disclosure are initially described in the context of a wireless communication system. Specific examples are then described for network configurations to reduce delays in transitioning between a trusted WLAN and a WWAN. Aspects of the disclosure are further illustrated by and described with reference to apparatus diagrams, system diagrams, and flowcharts that relate to efficient transition between a trusted WLAN and a WWAN.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may represent a network that reduces communication delays when transitioning between a trusted WLAN and a WWAN.

Base stations 105 may wirelessly communicate with UEs 115 via at least one base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The wireless communications system 100 may also include at least one access point (AP) 106, which may communicate with UEs 115 such as mobile stations, personal digital assistant (PDAs), other handheld devices, netbooks, notebook computers, tablet computers, laptops, display devices (e.g., TVs, computer monitors, etc.), printers, etc. in some cases the AP 106 may be a component of a WLAN, which may be a trusted WLAN associated with the WWAN of wireless communications system 100. The AP 106 and the associated UEs 115 may represent a basic service set (BSS) or an extended service set (ESS). The various UEs 115 in the network are able to communicate with one another through the AP 106. Also shown is a coverage area 110 of the AP 106, which may represent a basic service area (BSA) of the wireless communications system 100. An extended network station (not shown) associated with the wireless communications system 100 may be connected to a wired or wireless distribution system that may allow multiple APs 106 to be connected in an ESS.

Although not shown in FIG. 1, a UE 115 may be located in the intersection of more than one coverage area 110 and may associate with more than one base station 105 or AP 106. A single AP 106 and an associated set of UEs 115 may be referred to as a BSS. An ESS can be a set of connected BSSs. A distribution system (not shown) may be used to connect APs 106 in an ESS. In some cases, the coverage area 110 of an AP 106 may be divided into sectors (also not shown). The wireless communications system 100 may include APs 106 of different types (e.g., metropolitan area, home network, etc.), with varying and overlapping coverage areas 110. Two UEs 115 may also communicate directly via a direct wireless link 125 regardless of whether both UEs 115 are in the same coverage area 110. Examples of direct wireless links 120 may include Wi-Fi Direct connections, Wi-Fi Tunneled Direct Link Setup (TDLS) links, and other group connections. UEs 115 and APs 106 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within wireless communications system 100.

A base station 105 or an AP 106 may be connected by an S1 interface to the core network 130. The core network may be an evolved packet core (EPC), which may include at least one mobility management entity (MME), at least one serving gateway (S-GW), and at least one PDN gateway (P-GW). The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

In some wireless communications systems, an operator of a wireless network may enable a UE 115 to dynamically communicate using different radio access technologies (RATs). By allowing a UE to transition from one RAT to another, an operator may mitigate bandwidth usage to improve overall communication efficiency and throughput. For example, a UE may initially communicate over a WWAN, such as a Long Term Evolution (LTE)/LTE-Advanced (LTE-A) network, and the operator may enable the UE 115 to transition or offload to a WLAN to improve bandwidth availability in the WWAN. In some cases, operators may use commercially deployed WLAN offloading mechanisms with different inter-system mobility policies (e.g., multiple-access packet data network (PDN) connectivity (MAPCON)). When the UE 115 leaves the coverage area of the WLAN, communication may resume on the WWAN.

Wireless communications systems may use various methods to offload traffic. For example, a system may send traffic over a PDN connection with a WWAN and use non-seamless WLAN offload (NSWO) procedures (which may also be known as local break-out (LBO)) where traffic does not return to the operator's core network. Additionally or alternatively, internet protocol (IP) multimedia subsystem (IMS) communications and other operator-services traffic (such as traffic over an IMS or operator-specific PDNs via a WWAN) may use an IP security (IPsec) tunnel to an evolved packet data gateway (EPDG). A link from the EPDG to the PDN gateway (PGW) (e.g., an S2b link) may then be used to bring traffic back into the operator's core network.

Some wireless communications systems may use deployments of enhanced packet core (EPC) networks (e.g., SaMOG) where APs 106 may be associated with trusted or untrusted WLANs. An untrusted WLAN AP 106 may not be owned or manufactured by the operator providing network access. As a result, the link to the network may implement separate or additional security measures. Conversely, a trusted WLAN AP 1016 may be owned or manufactured by the network operator and may accordingly use lesser security measures. In some cases, the traffic associated with a UE's communication may be returned to the operator's network when connected to a trusted WLAN. In such cases, instead of NSWO (or LBO) the internet traffic may be returned to the operator's core network via a PDN and a link (e.g., an S2a link) from the trusted wireless access gateway (TWAG) to the PDN gateway (PGW). In some cases, IMS and other operator-services traffic may be transmitted over a different link (e.g., an S2b link) as the UE 115 may be unaware that the connection can be associated with trusted WLAN.

If a UE 115 is within a WWAN coverage area while communicating over a WLAN, the UE 115 may remain attached to the WWAN via a PDN connection. For example, the UE 115 may remain attached through a functional layer of a protocol stack, such as a non-access status (NAS) layer. This connection may remain in place even though there may not be any traffic communicated with the WWAN over the PDN. In some cases, this may be the result of a high level operating system (HLOS) (e.g., Android, Windows, etc.) that may direct communications to the WLAN interface unless the user disables the WLAN connection. If the UE 115 moves out of the WLAN coverage area and needs to communicate data via the WWAN again, delays in attaching to WWAN may be avoided due to the maintained connection. For example, if a user is in the middle of a voice call, the call may seamlessly migrate from a voice-over-Wi-Fi (VoWi-Fi) call to a voice-over-LTE (VoLTE) call with minimal or no interruption.

In some cases, when a UE 115 is both connected to a WLAN and simultaneously located within a WWAN coverage area, the UE 115 may not be able to remain attached to the WWAN. For example, the UE 115 may not remain attached through a PDN because a PGW may only establish one link at a time. That is, the PGW may only be connected through a link to the WWAN network (e.g., an S5 link) or a link to WLAN network (e.g., an S2a or an S2b link). Based on the limited number of connections, the PGW may cause the WWAN to send a detach request to the UE 115 shortly after being connected to WLAN. Due to independent operation of a UE's WLAN and WWAN components, this detachment may lead to various communications disruptions and delays.

In one example, after the UE 115 receives the detach request from the WWAN it may continually attempt to re-attach to the WWAN. The UE 115 may be rejected by the network on each re-attach attempt which may be the result of both the UE 115 and network following retry algorithms (e.g., a NAS retry algorithm) and backoff timers (e.g., a T3402 timer). This can lead to the UE 115 being unable to re-attach to the WWAN network for an extended period of time (e.g., up to 12 minutes or the default value of T3402timer). In the meantime, if the UE 115 moves out of the WLAN coverage area, it may not have WWAN data service for the duration of the timer. As an example, if a user is in the midst of a VoWi-Fi call, the call may be dropped and the user may not make a VoLTE call until the timer expires, let alone obtain internet service through the WWAN.

In another example, when a UE 115 attempts to re-attach to the WWAN following the detach request, the PGW may assume the UE 115 lost its WLAN coverage and accept the re-attachment request. As a result, the PGW may accept the WWAN request and revoke the WLAN link. The UE 115 may be disassociated from the WLAN, but since the WLAN signal may still be present, the UE 115 may then attempt to re-associate with the WLAN network. This may lead to the PGW subsequently accepting the WLAN link and again detaching the WWAN link. This cycle may repeat in a loop and the UE 115 may not receive any service because it keeps ping-ponging between transient connections on WWAN and WLAN. In some cases, these delays and disruptions may also apply to certain communications links (e.g., an S2b link) if internet traffic may be brought back to an operator's core network instead of using LBO. As a result, UEs 115 may encounter these delays and disruptions when a network starts using trusted WLAN procedures.

An access point name (APN) may be the name of a gateway (GW) between a wireless network and another computer network (e.g., the Internet). A UE 115 making a data connection (as opposed to, e.g., a CS voice connection) must be configured with an APN, which it conveys upon accessing the network. A server of the core network 130 may then examine the APN to determine what type of network connection should be created (e.g., what IP or internet protocol IP multimedia subsystem (IMS) address should be assigned or what security methods should be used). In other words, the APN may identify the packet data network (PDN) that a UE 115 wants to communicate with. In addition to identifying a PDN, an APN may also be used to define a service type (e.g., a wireless application protocol (WAP) server or multimedia messaging service (MMS)) that can be provided by the PDN.

In some cases, wireless communications system 100 may utilize at least one enhanced component carrier (eCC). An eCC may be characterized by features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator can be licensed to use the spectrum).

An eCC characterized by flexible bandwidth may include at least one segments that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

Flexible bandwidth and variable TTIs may be associated with a modified control channel configuration (e.g., an eCC may utilize an enhanced physical downlink control channel (ePDCCH) for DL control information). For example, at least one control channel of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARQ) related control information.

Thus, a UE 115 may prevent rejected attachment requests when connecting to a trusted WLAN and from a WWAN such as an LTE network. For example, an attachment PDN connection may be maintained with the WWAN while connected to the trusted WLAN. In some cases, the connection used to maintain the attachment may be an internet protocol (IP) multimedia subsystem (IMS) connection. Alternatively, the UE 115 may determine that the WLAN connection is a trusted connection and deactivate the WWAN connection. Should the WLAN become unavailable, the UE 115 may reactivate the connection with the WWAN.

Figure 2:
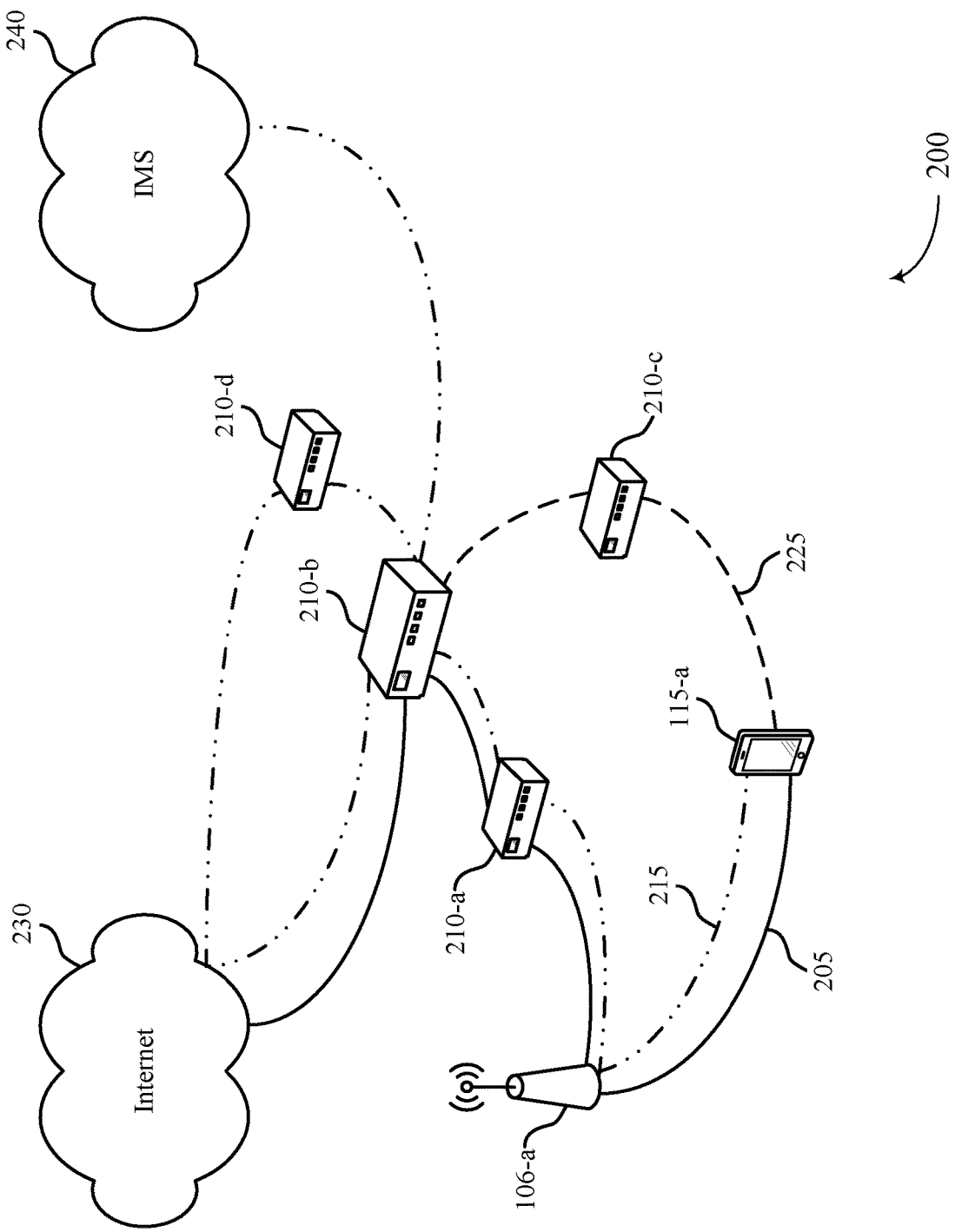
FIG. 2 illustrates an example of a wireless communications system that supports efficient transition between a trusted WLAN and a WWAN in accordance with aspects of the present disclosure.

FIG. 2 illustrates an example of a wireless communications system 200 for efficient transition between a trusted WLAN and a WWAN. Wireless communications system 200 may include AP 106-a (which may be a component of the trusted WWAN), UE 115-a, and network devices 210, which may be examples of the corresponding devices described with reference to FIG. 1. Wireless communications system 200 may represent examples of network configurations that minimize delays in trusted WLAN and WWAN transitions by a UE 115.

UE 115-a may connected to one or more services (e.g., the internet) via a PDN connection 205 through WLAN AP 106-a (as illustrated) or a WWAN base station 105 (not shown). For example, PDN connection 205 may be routed through at least one network device 210 to internet services 230. For example, PDN connection 205 may attach AP 106-a to network device 210-a, which may represent a TWAG.

From network device 210-a, the PDN connection may then be connected to internet services 230 through network device 210-b, which may represent an example of a PGW. In some cases, UE 115-a may also be connected to AP 106-a through IMS PDN connection 215, which may be routed through at least one network device 210 to IMS services 240. For example, IMS services 240 may include voice over LTE (VoLTE) services.

IMS PDN connection 215 may be routed through network device 210-a and network device 210-b to connect to internet services 230. From internet services 230, IMS PDN connection 215 may be attached to network device 210-d, which may represent an example of a PDG or an enhanced PDG (ePDG).

IMS PDN connection 215 may then be attached to IMS services 240 through network device 210-b. Wireless communications system 200 may be configured to eliminate communication delays when transitioning between a trusted WLAN and a WWAN.

In some cases, UE 115-a may establish an attachment (or "dummy") PDN in order to maintain a connection with the WWAN while connected to a trusted WLAN. For example, UE 115-a and the WWAN network may be configured to establish an attachment PDN connection 225. In some cases, attachment PDN connection 225 may not be used for user plane traffic. In some cases, attachment PDN connection 225 may be used as an initial attachment PDN for WWAN use by a UE's WWAN modem.

Attachment PDN connection 225 may be routed through a network device 210-c, which may represent an example of a serving gateway (SGW). Attachment PDN connection 225 may terminate at a network device 210-b, which may be an example of a PGW as discussed above. In some cases, the UE's HLOS may be unaware of attachment PDN connection 225 and may continue to use PDN connection 205 with the WLAN for communications.

Due to the presence of attachment PDN connection 225, the traffic over the PDN connection 205 with the WLAN may be established without the UE 115-a detaching from the WWAN (i.e., through a base station 105). In some cases, IMS PDN connection 215 may operate as a separate PDN connection and be maintained over the WWAN (not shown), or it may move over to the WLAN as a link tunnel (e.g., over S2a or S2a links) while in WLAN coverage (as illustrated).

In some cases, whether the WLAN connection may be associated with a trusted WLAN AP 106 may not be known to UE 115-a. However, in some cases UE 115-a may determine whether the WLAN is a trusted WLAN. For example, a network using a trusted WLAN may assign the same IP address to UE 115-a when using both WWAN and WLAN. Thus, when connecting to a WLAN using the same IP address, UE 115-a may assume that the WLAN AP 106-a is a trusted WLAN. UE 115-a may be enabled to determine or assume the connection with a trusted WLAN AP 106 by receiving a list of service set identifiers (SSIDs) used by the operator that are indicated as trusted WLAN SSIDs.

Based on the determination of the trusted WLAN connection, UE 115-a may subsequently refrain from trying to attach to the WWAN by itself (e.g., by either going into a CS only mode or disabling WWAN mode). Thus, the assumption made by UE 115-a may prevent a situation where the network bars UE 115-a for a backoff time period (as discussed above), and delays in communications may be avoided. If UE 115-a loses WLAN coverage or attempts to connect to a WWAN again, it may first disassociate from the WLAN and then begin the attach process on the WWAN network.

In some cases, enabling UE 115-a to determine whether a WLAN is a trusted WLAN may be an alternative to configuring an attachment PDN connection 205. However, in some cases, the attachment PDN connection 205 may result in improved delay reduction. That is, if UE 115-a loses its WLAN connection (e.g., due to the WLAN becoming unavailable for various reasons) there may be short delay for UE 115-a to re-establish the WWAN connection. In some cases, this delay may be reduced if UE 115-a does not completely disconnect from the WWAN service. For example, UE 115-a may go into a WWAN limited service mode. Therefore, when UE 115-a attempts to reconnect to the WWAN, it may only complete upper layer procedures to attach.

Thus, in some cases, UE 115-a may assume that when it identifies the same IP address on WLAN that it is a trusted WLAN network and may subsequently avoid attempting redundant attachment procedures with the WWAN. In some cases, the determination of the trusted WLAN AP 106 may be accomplished by provisioning UE 115-a with a list of SSIDs used by the operator that are associated with trusted WLAN APs 106.

In some cases, UE 115-a may retain an IMS PDN connection on the WWAN in place of the attachment PDN connection 225 (not shown) and may refrain from transitioning IMS services 240 to the WLAN (e.g., through IMS PDN 215). This may enable UE 115-a to continue service with minimal or no interruption when transitioning from the WLAN back to the WWAN.

In some cases, network-based IP flow mobility (NB-IFOM) may be deployed by an operator and through this technique a UE may attach to a network using both WWAN and WLAN links to a single PDN. However, a non-NB-IFOM capable UE may still be able to communicate efficiently using the methods described herein.

Figure 3:
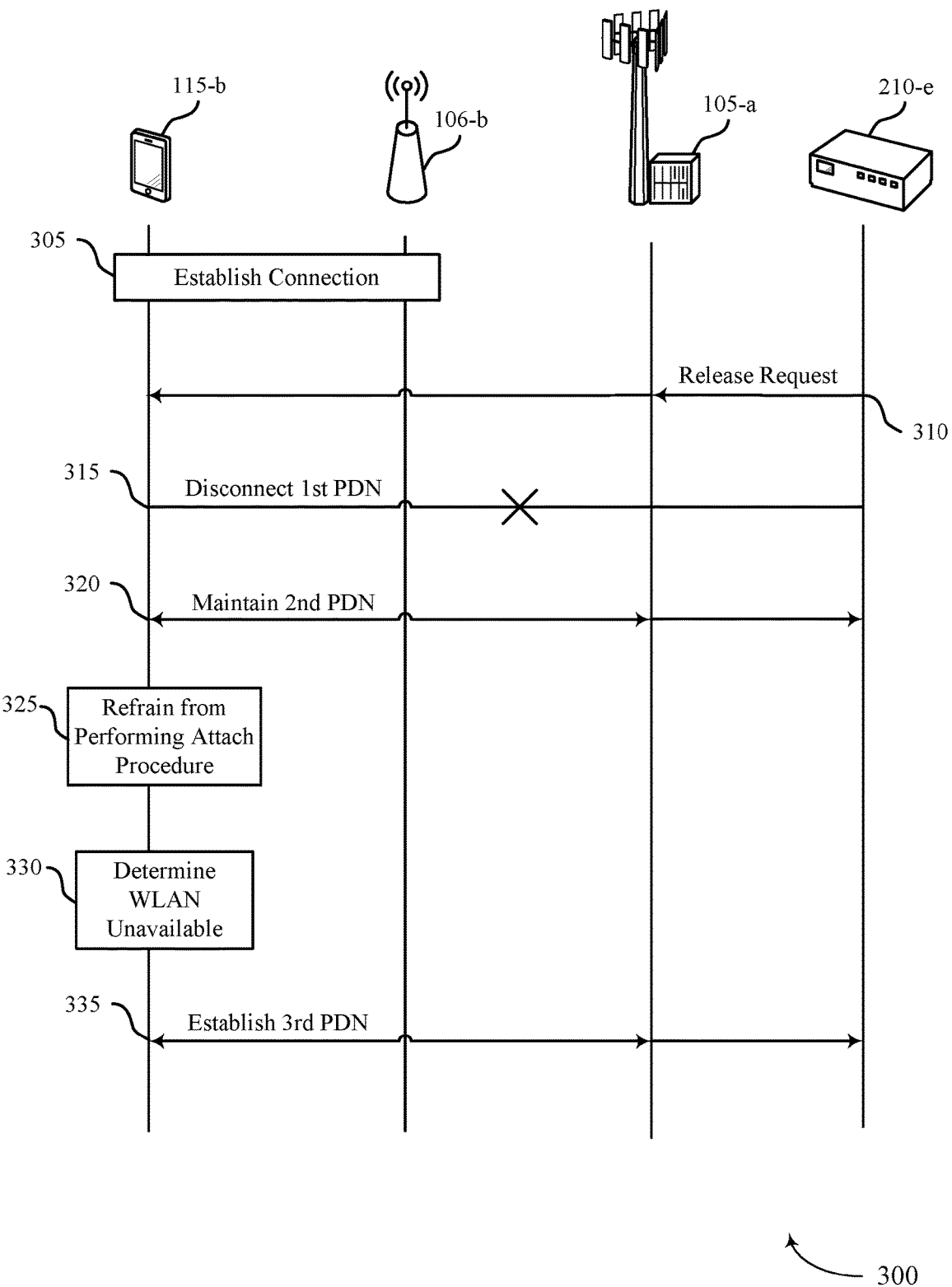
FIGS. 3 through 5 illustrate example process flows that support efficient transition between a trusted WLAN and a WWAN in accordance with aspects of the present disclosure.

FIG. 3 illustrates an example of a process flow 300 for efficient transition between a trusted WLAN and a WWAN. In some cases, process flow 300 may represent aspects of techniques performed by UE 115-b, AP 106-b, base station 105-a, or network device 210-e, as described with reference to FIGS. 1-2. Process flow 300 may illustrate an example an attachment PDN connection used to reduce delays in communication.

At step 305, UE 115-b may establish a connection with a WLAN through AP 106-b. In some examples, the connection may be a trusted WLAN connection. UE 115-b may already be attached to a WWAN prior to entering the coverage area of the trusted WLAN. For example, UE 115-b may have an established internet PDN and a "dummy" attachment PDN with the WWAN prior to entering the coverage area of the WLAN.

At step 310, network device 210-e may transmit a release request for the WWAN internet PDN connection to the UE through base station 105-a. In some cases, a request to detach from the WWAN may be transmitted by network device 210-e based on the connection with the WLAN.

At step 315, UE 115-b may disconnect a first PDN connection with a WWAN (i.e., an internet PDN) that was established with network device 210-e through base station 105-a. In some cases, disconnecting the first PDN connection is based on the release request.

At step 320, UE 115-b may maintain a second PDN connection with the WWAN while connected to the WLAN (i.e., the "dummy" attachment PDN), and network device 210-e may maintain the second PDN connection over the WWAN (e.g., through base station 105-a). In some cases, the second PDN connection is an attachment PDN that terminates at network device 210-e (i.e., it may not be used for transferring user data).

At step 325, UE 115-b may refrain from performing an attachment procedure with the WWAN based on the second PDN connection. That is, since it has an existing PDN attachment to the WWAN it may not attempt to reattach, whereas if it did not have the "dummy" attachment PDN it may automatically attempt to reattach after releasing the WWAN connections. In some cases, the presence of the second PDN connection may be used as an initial attachment PDN for the WWAN by a UE modem.

At step 330, UE 115-b may determine that the connection with the WLAN through AP 106-b is unavailable. For example, UE 115-b may move outside of the coverage area of AP 106-b.

At step 335, UE 115-b may establish a third PDN connection with the WWAN (i.e., an internet PDN connection) through base station 105-a based on the second PDN connection. The third PDN connection may be established with network device 210-e. In some cases, the third PDN may be the same as the first PDN connection. In some cases, establishing the third PDN may be performed faster due to the existence of the second PDN connection.

Figure 4:
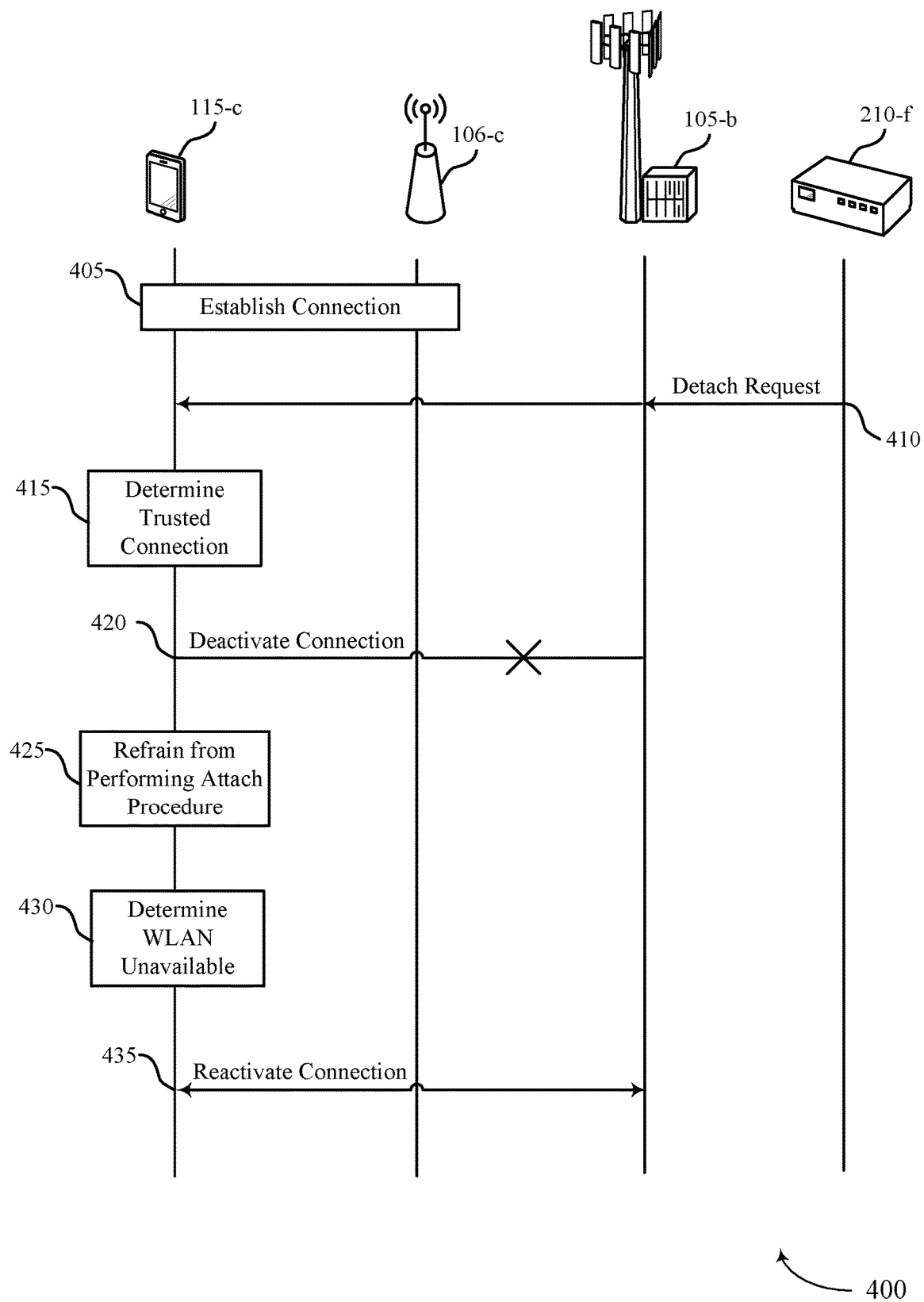

FIG. 4 illustrates an example of a process flow 400 for efficient transition between a trusted WLAN and a WWAN. In some cases, process flow 400 may represent aspects of techniques performed by a UE 115 or base station 105 as described with reference to FIGS. 1-2. Process flow 400 may illustrate an example of efficient communication through a determination that a UE 115-c is attached to a trusted WLAN.

At step 405, UE 115-c may establish a connection with a WLAN through AP 106-c. UE 115-c may already be attached to a WWAN prior to entering the coverage area of the WLAN. For example, UE 115-c may have an established internet PDN and an IMS PDN with the WWAN prior to entering the coverage area of the WLAN.

At step 410, network device 210-f may transmit a detach request from the WWAN to UE 115-c through base station 105-b. UE 115-c may receive the detach request from the WWAN based on the connection with the WLAN.

At step 415, UE 115-c may determine that a connection with the WLAN includes a trusted connection. In some cases, determining that the connection with the WLAN is a trusted connection may be based on an IP address assigned by the WLAN, an SSID of the WLAN, an authentication mode of the WLAN, or any combination thereof.

At step 420, UE 115-c and base station 105-b may deactivate a connection with a WWAN based on the determination that the connection with the WLAN is a trusted connection. In some cases, deactivating the connection may include entering a CS only mode, disabling a communication mode of for the WWAN, initiating a limited service mode, or any combination thereof.

At step 425, UE 115-c may refrain from performing an attachment procedure with the WWAN based on deactivating the connection with the WWAN. That is, since the connection is deactivated, UE 115-c may not automatically perform the attachment procedure as it would if an active connection were released.

At step 430, UE 115-c determine that the connection with the WLAN through AP 106-c is unavailable (i.e., it may move out of the WLAN coverage area), and at step 435, UE 115-c may reactivate the connection with the WWAN based on the determination that the connection with the WLAN is unavailable.

Figure 5:
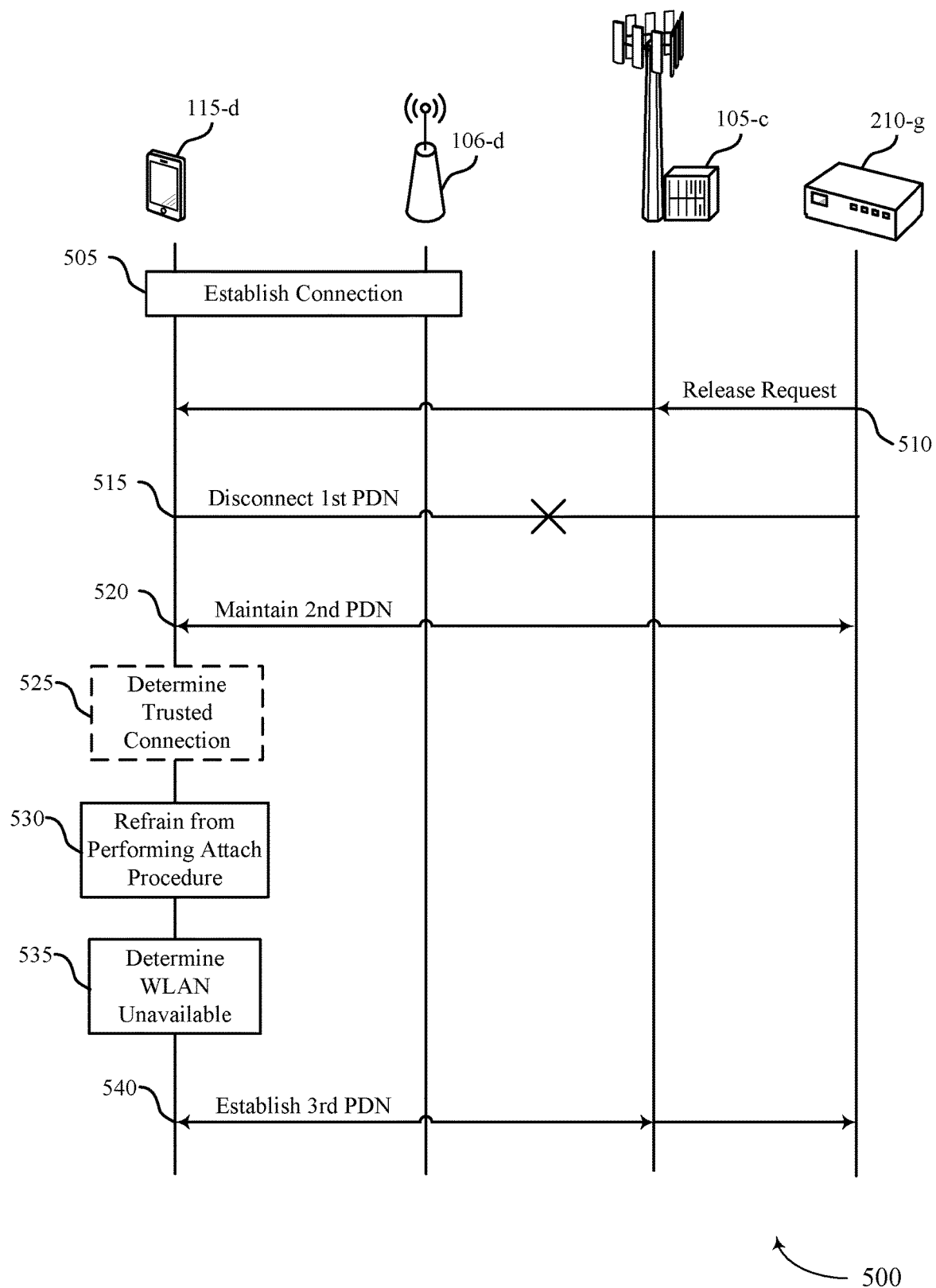

FIG. 5 illustrates an example of a process flow 500 for efficient transition between a trusted WLAN and a WWAN in accordance with various aspects of the present disclosure. Process flow 500 may include base station 105-c and UE 115-d, which may be examples of the corresponding devices described with reference to FIG. 1-2.

At step 505, UE 115-d may establish a connection with a WLAN through AP 106-d. UE 115-d may already be attached to a WWAN prior to entering the coverage area of the WLAN. For example, UE 115-d may have an established internet PDN and an IMS PDN with the WWAN prior to entering the coverage area of the WLAN.

At step 510, network device 210-g may transmit a release request for the first PDN connection to the UE through base station 105-c. In some cases, a request to detach from the WWAN may be transmitted by network device 210-g based on the connection with the WLAN.

At step 515, UE 115-d may disconnect a first PDN connection with a WWAN (i.e., an internet PDN) that was established with network device 210-g through base station 105-c. In some cases, disconnecting the first PDN connection is based on the release request.

At step 520, UE 115-d may maintain a second PDN connection with the WWAN (i.e., the IMS PDN) while connected to the WLAN. In some cases, UE 115-d may refrain from establishing an IMS connection with the WLAN based on the second PDN connection, and UE 115-d may communicate using the IMS connection over the WWAN while connected to the WLAN. Network device 210-g may refrain from establishing the IMS connection over a trusted WLAN.

At step 525, UE 115-d may (optionally) determine that a connection with the WLAN is a trusted connection. In some cases, determining that the connection with the WLAN is a trusted connection may be based on an IP address assigned by the WLAN, an SSID of the WLAN, an authentication mode of the WLAN, or any combination thereof. In other cases, UE 115-d may not be aware that the WLAN connection is a trusted connection.

At step 530, UE 115-*d* may refrain from performing an attachment procedure with the WWAN, based on the existence of the second PDN connection (i.e., the IMS PDN connection) with the WWAN.

At step 535, UE 115-*d* may determine that the connection with the WLAN through AP 106-*d* is unavailable. At step 540, UE 115-*d* may establish a third PDN connection with the WWAN through base station 105-*c* based on the second PDN connection. The third PDN connection may be established with network device 210-*g*. In some cases, the third PDN may be the same as the first PDN connection. In some cases, establishing the third PDN may be performed faster due to the existence of the second PDN connection.

Figure 6:
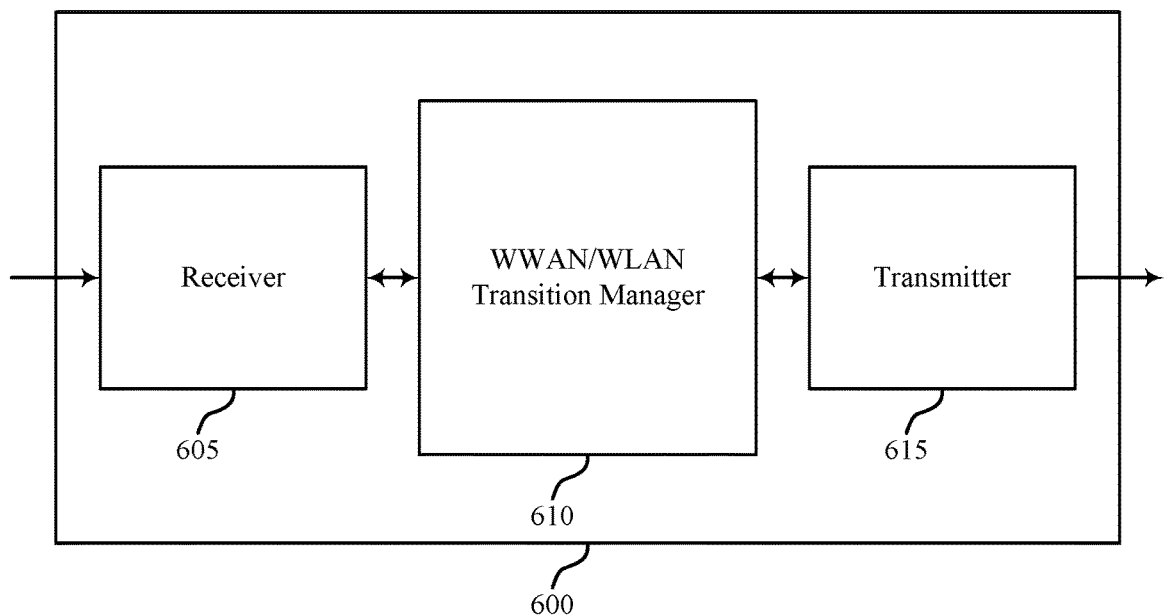
FIGS. 6 through 8 show block diagrams of a wireless device that supports efficient transition between a trusted WLAN and a WWAN in accordance with aspects of the present disclosure.

FIG. 6 shows a block diagram of a wireless device 600 that supports efficient transition between a trusted WLAN and a WWAN in accordance with various aspects of the present disclosure. Wireless device 600 may be an example of aspects of a UE 115 described with reference to FIGS. 1 and 2. Wireless device 600 may include receiver 605, WWAN/WLAN transition manager 610 and transmitter 615. Wireless device 600 may also include a processor. Each of these components may be in communication with each other.

The receiver 605 may receive information such as packets, user data, or control information associated with various information channels (e.g., control channels, data channels, and information related to efficient transition between a trusted WLAN and a WWAN, etc.). Information may be passed on to other components of the device. The receiver 605 may be an example of aspects of the transceiver 925 described with reference to FIG. 9. In some cases, the receiver 605 may include distinct receiver components for communicating with a WLAN and with a WWAN.

The WWAN/WLAN transition manager 610 may determine that a connection with a WLAN includes a trusted connection, deactivate a connection with the WWAN based on the determination that the connection with the WLAN is a trusted connection, refrain from performing an attachment procedure with the WWAN based on deactivating the connection with the WWAN, establish a connection with a WLAN, disconnect a first PDN connection with a WWAN based on the established connection with the WLAN, maintain a second PDN connection with the WWAN while connected to the WLAN, determine that the connection with the WLAN is unavailable, and establish a third PDN connection with the WWAN based on the second PDN connection. The WWAN/WLAN transition manager 610 may also be an example of aspects of the WWAN/WLAN transition manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas. In some cases, the transmitter 615 may include distinct transmitter components for communicating with a WLAN and with a WWAN.

Figure 7:
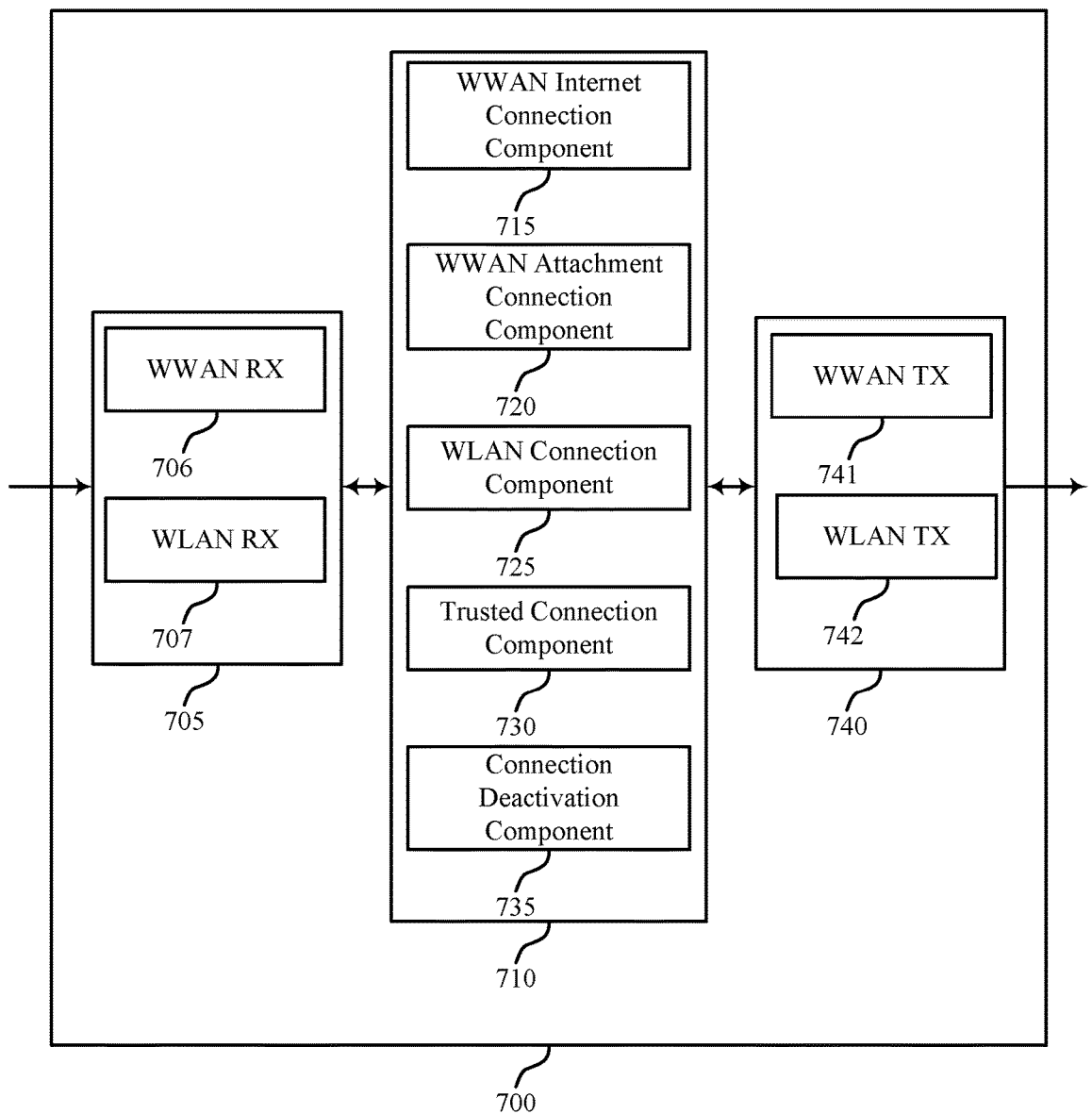

FIG. 7 shows a block diagram of a wireless device 700 that supports efficient transition between a trusted WLAN and a WWAN in accordance with various aspects of the present disclosure. Wireless device 700 may be an example of aspects of a wireless device 600 or a UE 115 described with reference to FIGS. 1, 2 and 6. Wireless device 700 may include receiver 705, WWAN/WLAN transition manager 710 and transmitter 740. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9. Receiver 705 may include WWAN receiver 706 (which may be a component of a WWAN transceiver) and WLAN receiver 707 (which may be a component of a WLAN transceiver).

The WWAN/WLAN transition manager 710 may be an example of aspects of WWAN/WLAN transition manager 610 described with reference to FIG. 6. The WWAN/WLAN transition manager 710 may include WWAN internet connection component 715, WWAN attachment connection component 720, WLAN connection component 725, trusted connection component 730 and connection deactivation component 735. The WWAN/WLAN transition manager 710 may be an example of aspects of the WWAN/WLAN transition manager 905 described with reference to FIG. 9.

The WWAN internet connection component 715 may connect and then disconnect a first PDN connection with a WWAN based on the established connection with the WLAN, and establish a third PDN connection with the WWAN based on the second PDN connection. The WWAN attachment connection component 720 may connect and maintain a second PDN connection with the WWAN while connected to the WLAN, refrain from performing an attachment procedure with the WWAN based on the second PDN connection, and refrain from performing an attachment procedure with the WWAN based on deactivating the connection with the WWAN. In some cases, the second PDN connection includes an attachment PDN that terminates at a WWAN network entity. In some cases, the second PDN connection includes an IMS connection.

The WLAN connection component 725 may establish a connection with a WLAN, and determine when the connection with the WLAN is unavailable. The trusted connection component 730 may determine that a connection with a WLAN includes a trusted connection, determine that the connection with the WLAN is a trusted connection is based on an IP address assigned by the WLAN, an SSID of the WLAN, an authentication mode of the WLAN, or any combination thereof, and determine that the connection with the WLAN is unavailable.

The connection deactivation component 735 may deactivate a connection with the WWAN based on the determination that the connection with the WLAN is a trusted connection. In some cases, deactivating the connection to the WWAN includes entering a CS only mode, disabling a communication mode of the WWAN, initiating a limited service mode, or any combination thereof.

The transmitter 740 may transmit signals received from other components of wireless device 700. In some examples, the transmitter 740 may be collocated with a receiver in a transceiver module. For example, the transmitter 740 may be an example of aspects of the transceiver 925 described with reference to FIG. 9. The transmitter 740 may utilize a single antenna, or it may utilize a plurality of antennas. Transmitter 740 may include WWAN transmitter 741 (which may be a component of a WWAN transceiver) and WLAN transmitter 742 (which may be a component of a WLAN transceiver).

Figure 8:
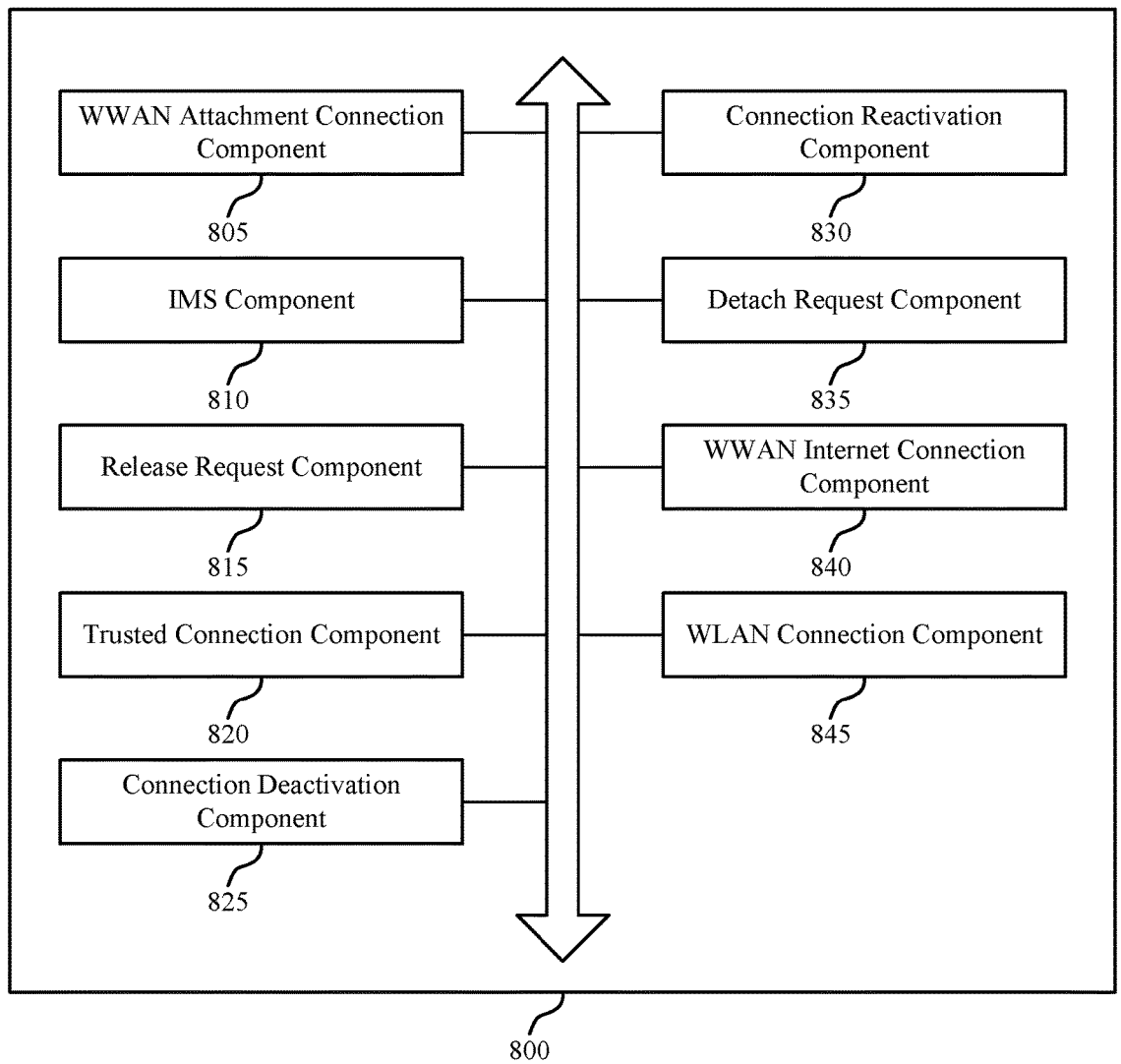

FIG. 8 shows a block diagram of a WWAN/WLAN transition manager 800 which may be an example of the corresponding component of wireless device 600 or wireless device 700. That is, WWAN/WLAN transition manager 800 may be an example of aspects of WWAN/WLAN transition manager 610 or WWAN/WLAN transition manager 710 described with reference to FIGS. 6 and 7. The WWAN/WLAN transition manager 800 may also be an example of aspects of the WWAN/WLAN transition manager 905 described with reference to FIG. 9.

The WWAN/WLAN transition manager 800 may include WWAN attachment connection component 805, IMS component 810, release request component 815, trusted connection component 820, connection deactivation component 825, connection reactivation component 830, detach request component 835, WWAN internet connection component 840 and WLAN connection component 845. Each of these modules may communicate, directly or indirectly, with one another (e.g., via multiple buses).

The WWAN attachment connection component 805 may refrain from performing an attachment procedure with the WWAN based on the second PDN connection, refrain from performing an attachment procedure with the WWAN based on deactivating the connection with the WWAN, and maintain a second PDN connection with the WWAN while connected to the WLAN. In some cases, the second PDN connection includes an attachment PDN that terminates at a WWAN network entity. In some cases, the second PDN connection includes an internet protocol IMS connection.

The IMS component 810 may refrain from establishing the IMS connection with the WLAN based on the second PDN connection, and communicate using the IMS connection over the WWAN while connected to the WLAN. The release request component 815 may receive a release request from the WWAN based on the connection with the WLAN, where disconnecting the first PDN connection is based on the detach request.

The trusted connection component 820 may determine that a connection with a WLAN includes a trusted connection, determine that the connection with the WLAN is a trusted connection is based on an internet protocol (IP) address assigned by the WLAN, a service set identifier (SSID) of the WLAN, an authentication mode of the WLAN, or any combination thereof, and determine that the connection with the WLAN is unavailable.

The connection deactivation component 825 may deactivate a connection with the WWAN based on the determination that the connection with the WLAN is a trusted connection. In some cases, deactivating the connection to the WWAN includes entering a circuit switch (CS) only mode, disabling a communication mode of the WWAN, initiating a limited service mode, or any combination thereof.

The connection reactivation component 830 may reactivate the connection with the WWAN based on the determination that the connection with the WLAN is unavailable. The detach request component 835 may receive a detach request from the WWAN based on the connection with the WLAN.

The WWAN internet connection component 840 may disconnect a first PDN connection with a WWAN based on the established connection with the WLAN, and establish a third PDN connection with the WWAN based on the second PDN connection. The WLAN connection component 845 may establish a connection with a WLAN, and determine that the connection with the WLAN is unavailable.

Figure 9:
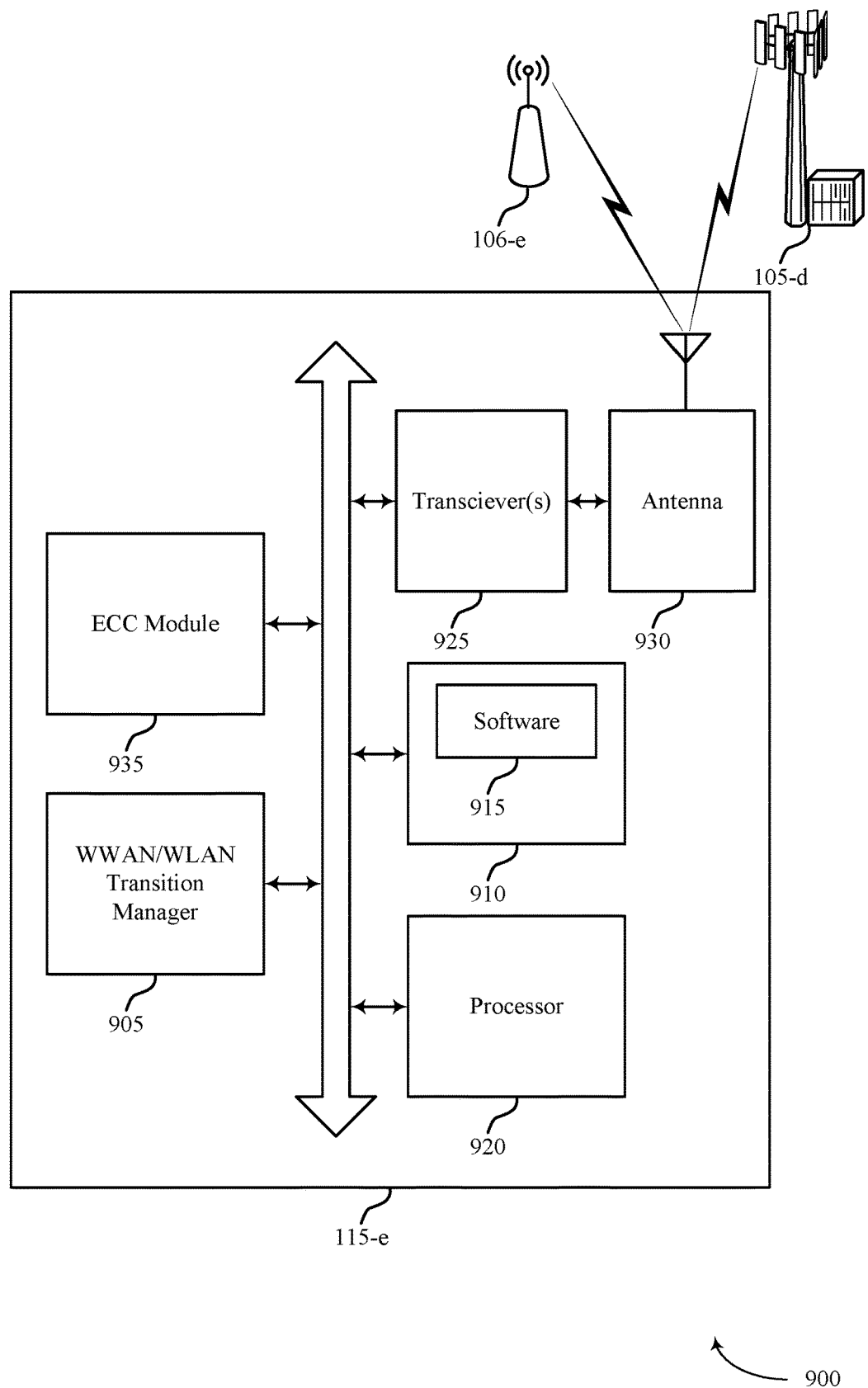
FIG. 9 illustrates a block diagram of a system including a UE that supports efficient transition between a trusted WLAN and a WWAN in accordance with aspects of the present disclosure.

FIG. 9 shows a diagram of a system 900 including a device that supports efficient transition between a trusted WLAN and a WWAN in accordance with various aspects of the present disclosure. For example, system 900 may include UE 115-e, which may be an example of a wireless device 600, a wireless device 700, or a UE 115 as described with reference to FIGS. 1, 2 and 6 through 8.

UE 115-e may also include WWAN/WLAN transition manager 905, memory 910, processor 920, transceiver 925, antenna 930 and ECC module 935. Each of these modules may communicate, directly or indirectly, with one another (e.g., via multiple buses). The WWAN/WLAN transition manager 905 may be an example of a WWAN/WLAN transition manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., efficient transition between a trusted WLAN and a WWAN, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.).

The transceiver 925 may communicate bi-directionally, via at least one antenna, wired, or wireless links, with at least one network, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the transceiver 925 may include distinct transceiver components for communicating with a WLAN and a WWAN. In some cases, the wireless device may include a single antenna 930. However, in some cases the device may have more than one antenna 930, which may be capable of concurrently transmitting or receiving multiple wireless transmissions. ECC module 935 may enable operations on ECCs such as communications in unlicensed spectrum using WWAN procedures, operations using flexible length TTIs, and narrowband or wideband operations as described above with reference to FIG. 1.

Figure 10:
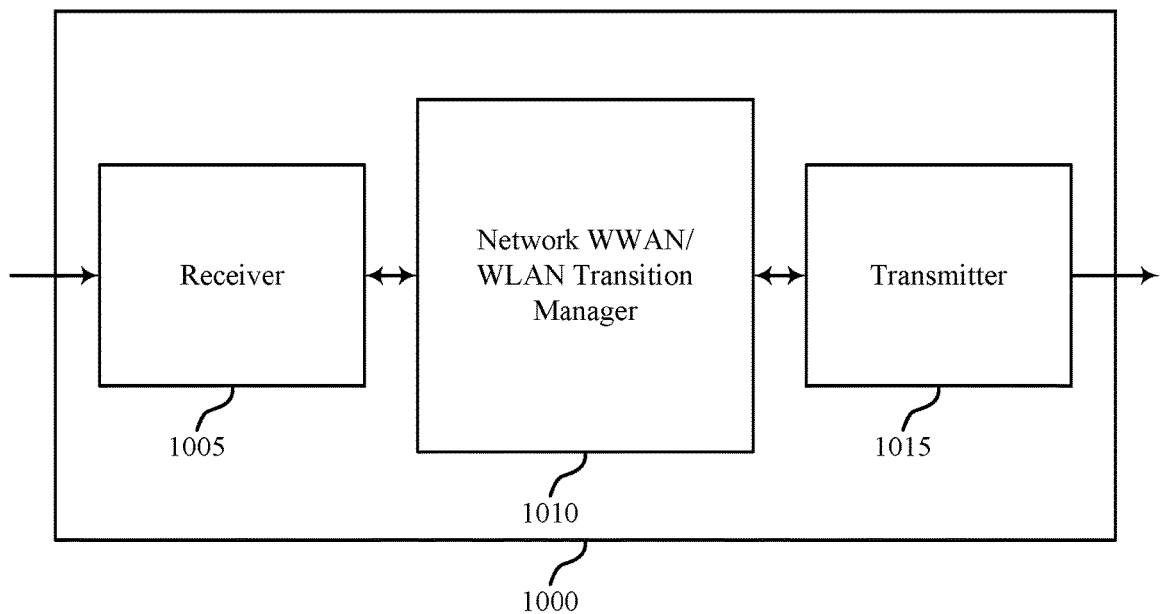
FIGS. 10 through 12 show block diagrams of a network device that supports efficient transition between a trusted WLAN and a WWAN in accordance with aspects of the present disclosure.

FIG. 10 shows a block diagram of a network device 1000 that supports efficient transition between a trusted WLAN and a WWAN in accordance with various aspects of the present disclosure. Wireless device 1000 may be an example of aspects of a network device 210 described with reference to FIGS. 1 and 2. Wireless device 1000 may include receiver 1005, network WWAN/WLAN transition manager 1010 and transmitter 1015. Wireless device 1000 may also include a processor. Each of these components may be in communication with each other.

The receiver 1005 may receive information such as packets, user data, or control information associated with various information channels (e.g., control channels, data channels, and information related to efficient transition between a trusted WLAN and a WWAN, etc.). Information may be passed on to other components of the device. The receiver 1005 may be an example of aspects of the WWAN communications manager 1325 described with reference to FIG. 13.

The network WWAN/WLAN transition manager 1010 may establish a first PDN connection with a UE over a WWAN, establish a second PDN connection with the UE over the WWAN, establish a third PDN connection with the UE over a trusted WLAN, disconnect the first PDN connection with the UE based on the third PDN connection, and maintain the second PDN connection while connected to the UE with the third PDN connection. The network WWAN/WLAN transition manager 1010 may also be an example of aspects of the network WWAN/WLAN transition manager 1305 described with reference to FIG. 13.

The transmitter 1015 may transmit signals received from other components of wireless device 1000. In some examples, the transmitter 1015 may be collocated with a receiver in a transceiver module. For example, the transmitter 1015 may be an example of aspects of the WWAN communications manager 1325 described with reference to FIG. 13.

Figure 11:
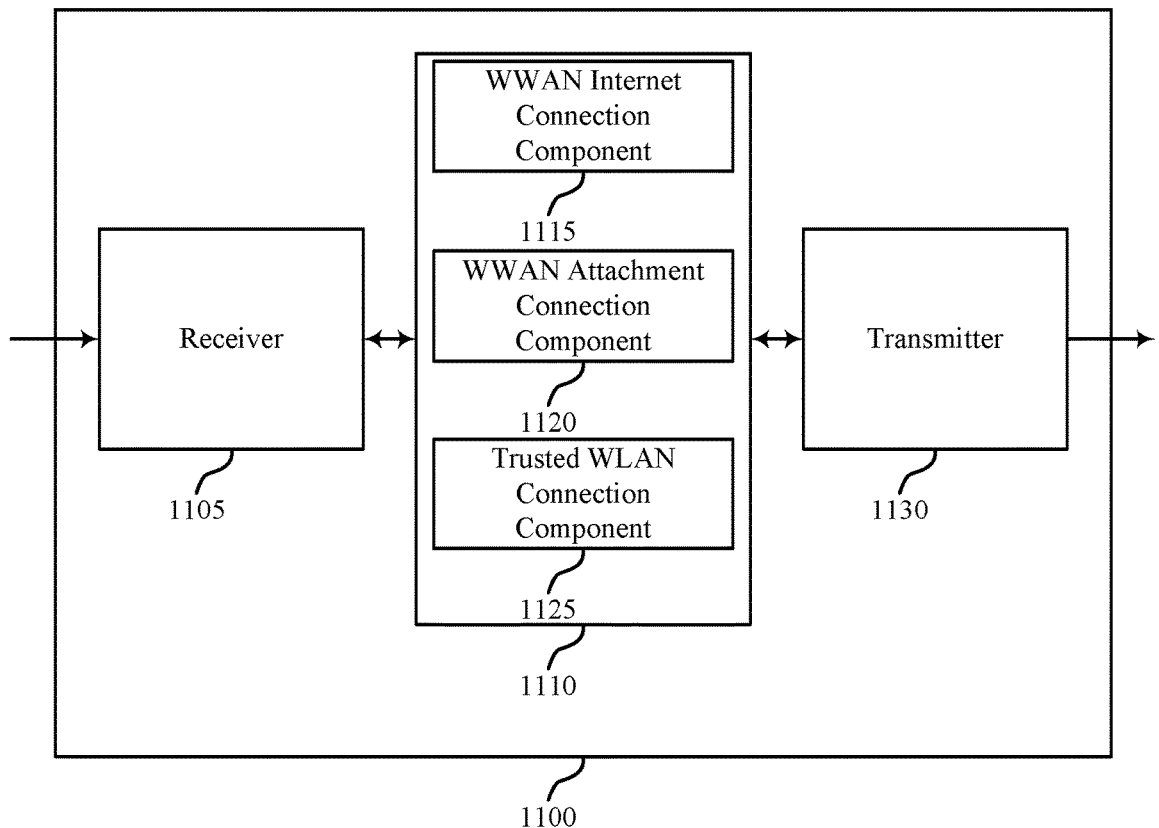

FIG. 11 shows a block diagram of a network device 1100 that supports efficient transition between a trusted WLAN and a WWAN in accordance with various aspects of the present disclosure. Network device 1100 may be an example of aspects of a network device 1000 or a network device 210 described with reference to FIGS. 1, 2 and 10. Network device 1100 may include receiver 1105, network WWAN/WLAN transition manager 1110 and transmitter 1130. Network device 1100 may also include a processor. Each of these components may be in communication with each other.

The receiver 1105 may receive information which may be passed on to other components of the device. The receiver 1105 may also perform the functions described with reference to the receiver 1005 of FIG. 10. The receiver 1105 may be an example of aspects of the WWAN communications manager 1325 described with reference to FIG. 13.

The network WWAN/WLAN transition manager 1110 may be an example of aspects of network WWAN/WLAN transition manager 1010 described with reference to FIG. 10. The network WWAN/WLAN transition manager 1110 may include WWAN internet connection component 1115, WWAN attachment connection component 1120 and trusted WLAN connection component 1125. The network WWAN/WLAN transition manager 1110 may be an example of aspects of the network WWAN/WLAN transition manager 1305 described with reference to FIG. 13.

The WWAN internet connection component 1115 may establish a first PDN connection with a UE over a WWAN, disconnect the first PDN connection with the UE based on the third PDN connection, and establish a fourth PDN connection over the WWAN with the UE based on the second PDN connection.

The WWAN attachment connection component 1120 may establish a second PDN connection with the UE over the WWAN, and maintain the second PDN connection while connected to the UE with the third PDN connection. In some cases, the second PDN connection includes an attachment PDN that terminates at a WWAN network entity. The trusted WLAN connection component 1125 may establish a third PDN connection with the UE over a trusted WLAN.

The transmitter 1130 may transmit signals received from other components of network device 1100. In some examples, the transmitter 1130 may be collocated with a receiver in a transceiver module. For example, the transmitter 1130 may be an example of aspects of a transceiver within the WWAN communications manager 1325 described with reference to FIG. 13.

Figure 12:
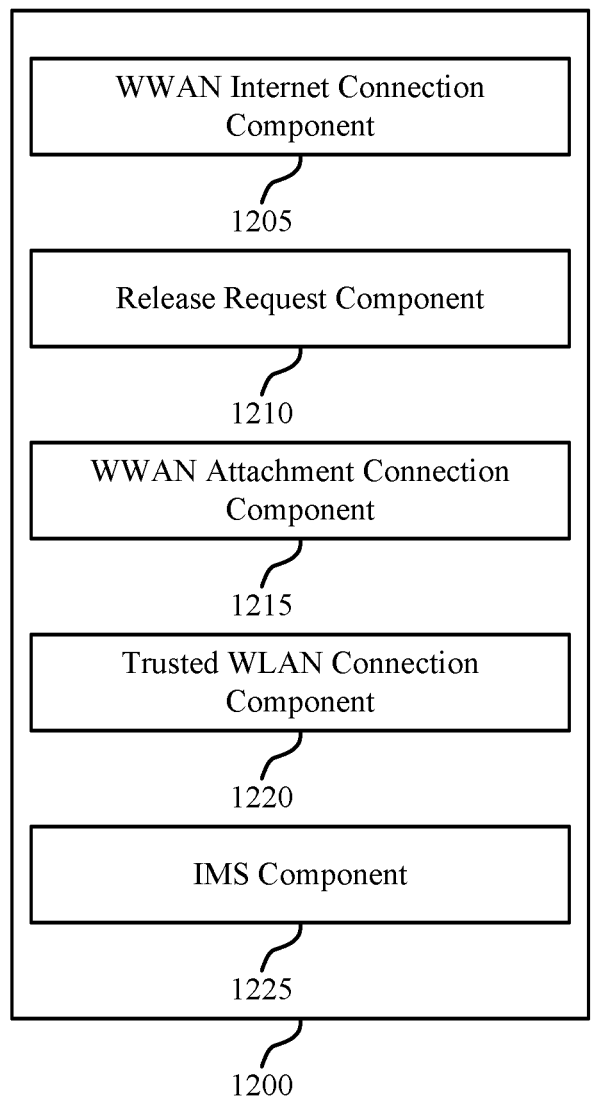

FIG. 12 shows a block diagram of a network WWAN/WLAN transition manager 1200 which may be an example of the corresponding component of network device 1000 or network device 1100. That is, network WWAN/WLAN transition manager 1200 may be an example of aspects of network WWAN/WLAN transition manager 1010 or network WWAN/WLAN transition manager 1110 described with reference to FIGS. 10 and 11. The network WWAN/WLAN transition manager 1200 may also be an example of aspects of the network WWAN/WLAN transition manager 1305 described with reference to FIG. 13.

The network WWAN/WLAN transition manager 1200 may include WWAN internet connection component 1205, release request component 1210, WWAN attachment connection component 1215, trusted WLAN connection component 1220 and IMS component 1225. Each of these modules may communicate, directly or indirectly, with one another (e.g., via at least one bus). The WWAN internet connection component 1205 may establish a first PDN connection with a UE over a WWAN, disconnect the first PDN connection with the UE based on the third PDN connection, and establish a fourth PDN connection over the WWAN with the UE based on the second PDN connection. The release request component 1210 may transmit a release request or a detach request to the UE for the first PDN connection based on the third PDN connection with the trusted WLAN.

The WWAN attachment connection component 1215 may establish a second PDN connection with the UE over the WWAN, and maintain the second PDN connection while connected to the UE with the third PDN connection. In some cases, the second PDN connection includes an attachment PDN that terminates at a WWAN network entity. The trusted WLAN connection component 1220 may establish a third PDN connection with the UE over a trusted WLAN. The IMS component 1225 may establish and maintain an internet protocol (IP) multimedia subsystem (IMS) connection.

Figure 13:
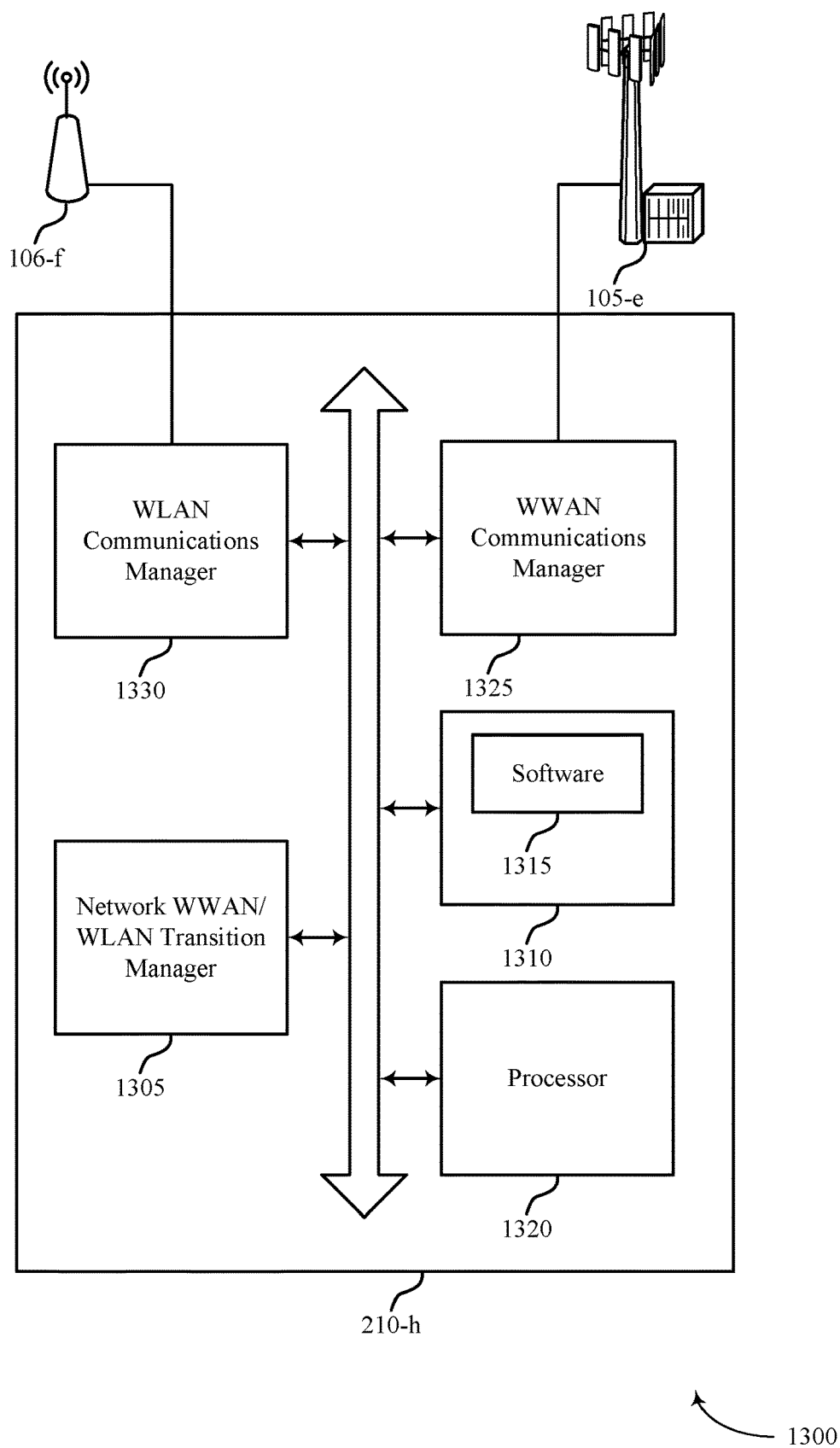
FIG. 13 illustrates a block diagram of a system including a network device that supports efficient transition between a trusted WLAN and a WWAN in accordance with aspects of the present disclosure.

FIG. 13 shows a diagram of a system 1300 including a network device that supports efficient transition between a trusted WLAN and a WWAN in accordance with various aspects of the present disclosure. For example, system 1300 may include network device 210-$h$, which may be an example of a network device 1000, a network device 1100, or a network device 210 as described with reference to FIGS. 1, 2 and 10 through 12.

Network device 210-$h$ may also include network WWAN/WLAN transition manager 1305, memory 1310, processor 1320, and WWAN communications manager 1325. Each of these modules may communicate, directly or indirectly, with one another (e.g., via at least one bus). The network WWAN/WLAN transition manager 1305 may be an example of a network WWAN/WLAN transition manager as described with reference to FIGS. 10 through 12.

The memory 1310 may include RAM and ROM. The memory 1310 may store computer-readable, computer-executable software including instructions that, when executed, cause the processor to perform various functions described herein (e.g., efficient transition between a trusted WLAN and a WWAN, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.).

WWAN communications manager 1325 may support communications with UEs 115 through at least one WWAN network access device such as base station 105-$e$. WLAN communications manager 1330 may support communications with UEs 115 through at least one WLAN network access device such as AP 106-$f$.

Figure 14:
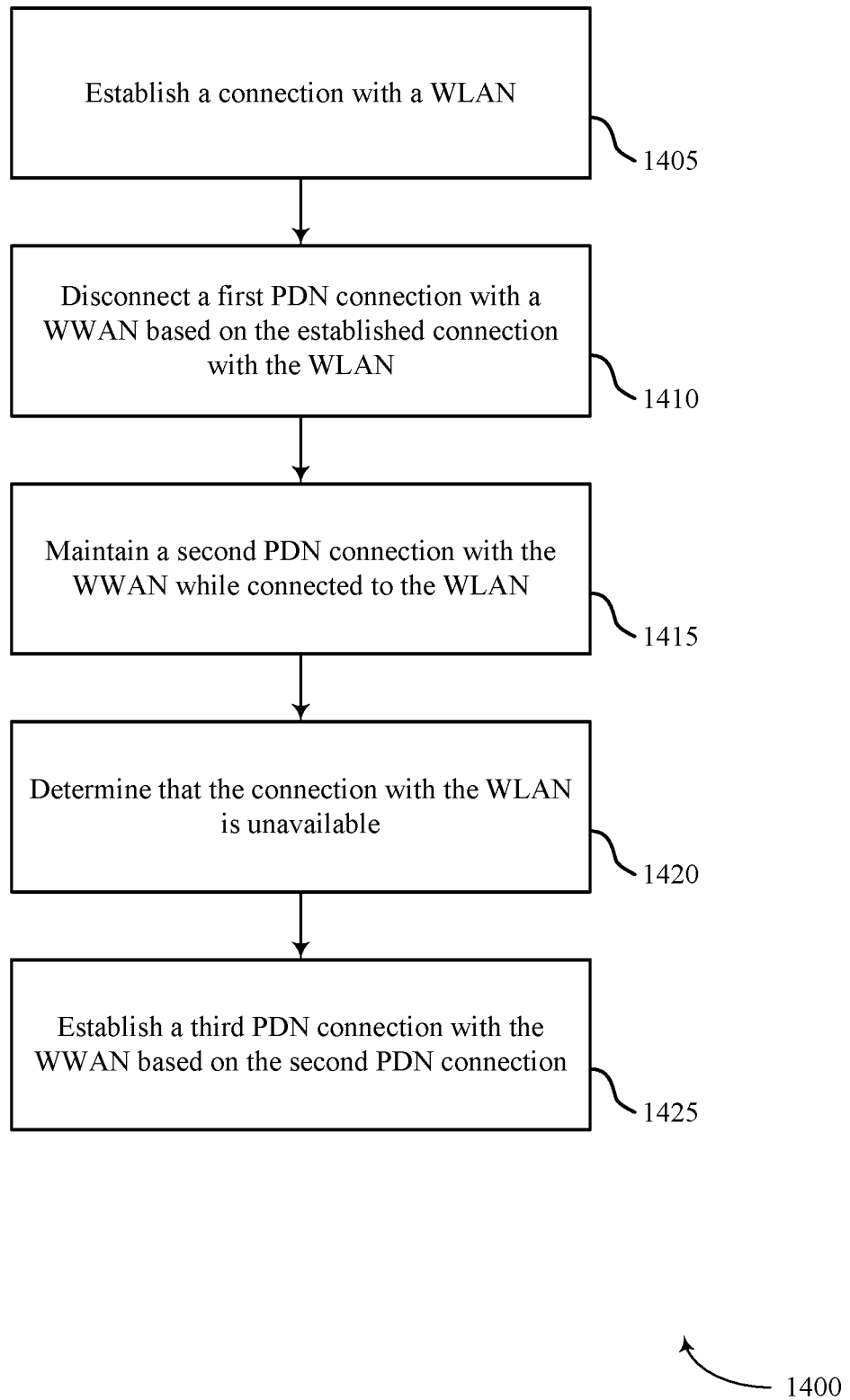
FIGS. 14 through 19 illustrate methods for efficient transition between a trusted WLAN and a WWAN in accordance with aspects of the present disclosure.

FIG. 14 shows a flowchart illustrating a method 1400 for efficient transition between a trusted WLAN and a WWAN in accordance with various aspects of the present disclosure. The operations of method 1400 may be implemented by a device such as a UE 115 or its components as described with reference to FIGS. 1 and 2. For example, the operations of method 1400 may be performed by the WWAN/WLAN transition manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may establish a connection with a WLAN as described above with reference to FIGS. 2 through 5. In certain examples, the operations of block 1405 may be performed by the WLAN connection component as described with reference to FIGS. 7 and 8.

At block 1410, the UE 115 may disconnect a first PDN connection with a WWAN based on the established connection with the WLAN as described above with reference to FIGS. 2 through 5. In certain examples, the operations of block 1410 may be performed by the WWAN internet connection component as described with reference to FIGS. 7 and 8.

At block 1415, the UE 115 may maintain a second PDN connection with the WWAN while connected to the WLAN as described above with reference to FIGS. 2 through 5. In certain examples, the operations of block 1415 may be performed by the WWAN attachment connection component as described with reference to FIGS. 7 and 8.

At block 1420, the UE 115 may determine that the connection with the WLAN is unavailable as described above with reference to FIGS. 2 through 5. In certain examples, the operations of block 1420 may be performed by the WLAN connection component as described with reference to FIGS. 7 and 8.

At block 1425, the UE 115 may establish a third PDN connection with the WWAN based on the second PDN connection as described above with reference to FIGS. 2 through 5. In certain examples, the operations of block 1425 may be performed by the WWAN internet connection component as described with reference to FIGS. 7 and 8.

Figure 15:
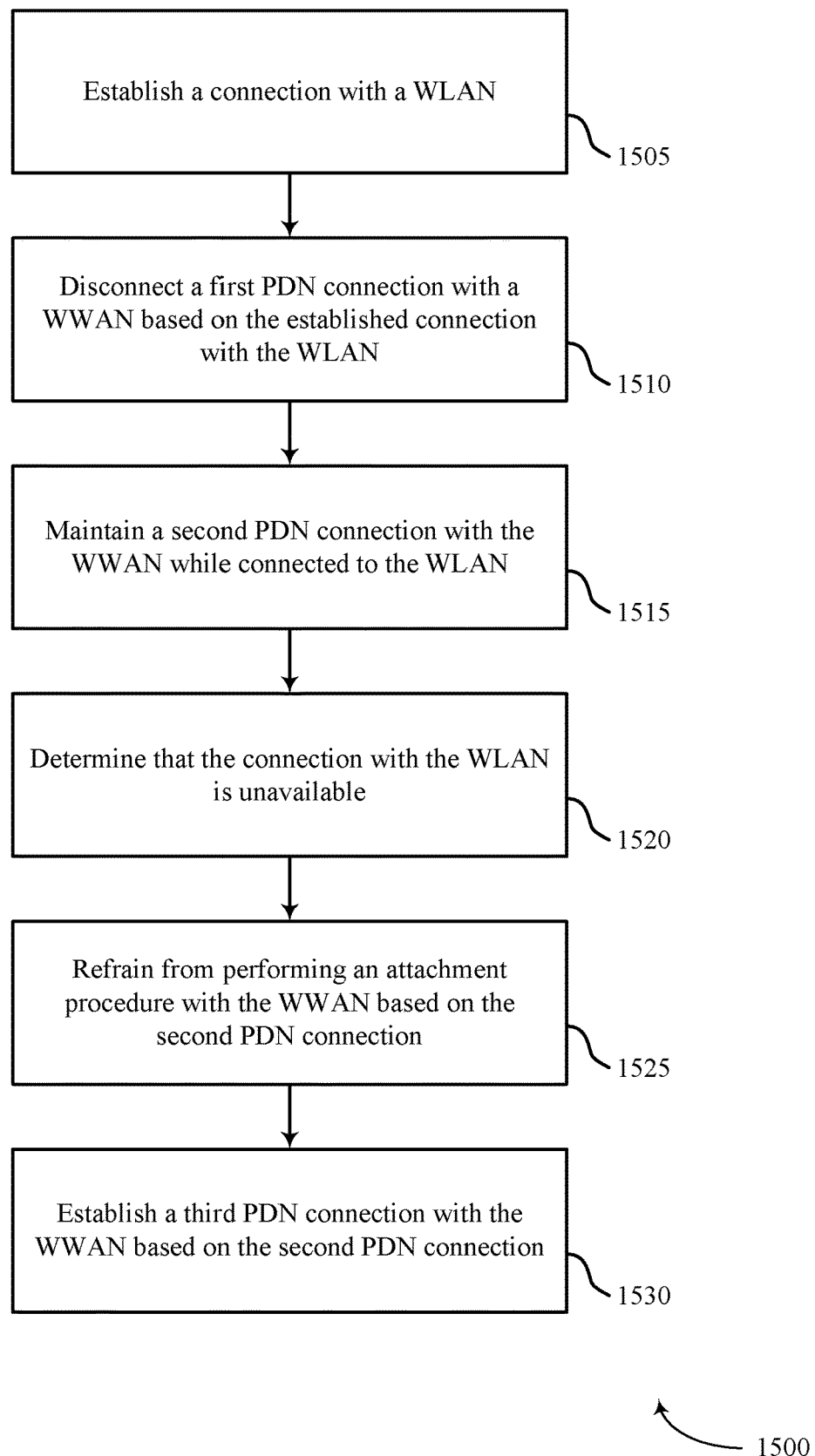

FIG. 15 shows a flowchart illustrating a method 1500 for efficient transition between a trusted WLAN and a WWAN in accordance with various aspects of the present disclosure. The operations of method 1500 may be implemented by a device such as a UE 115 or its components as described with reference to FIGS. 1 and 2. For example, the operations of method 1500 may be performed by the WWAN/WLAN transition manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may establish a connection with a WLAN as described above with reference to FIGS. 2 through 5. In certain examples, the operations of block 1505 may be performed by the WLAN connection component as described with reference to FIGS. 7 and 8.

At block 1510, the UE 115 may disconnect a first PDN connection with a WWAN based on the established connection with the WLAN as described above with reference to FIGS. 2 through 5. In certain examples, the operations of block 1510 may be performed by the WWAN internet connection component as described with reference to FIGS. 7 and 8.

At block 1515, the UE 115 may maintain a second PDN connection with the WWAN while connected to the WLAN as described above with reference to FIGS. 2 through 5. In certain examples, the operations of block 1515 may be performed by the WWAN attachment connection component as described with reference to FIGS. 7 and 8.

At block 1520, the UE 115 may determine that the connection with the WLAN is unavailable as described above with reference to FIGS. 2 through 5. In certain examples, the operations of block 1520 may be performed by the WLAN connection component as described with reference to FIGS. 7 and 8.

At block 1525, the UE 115 may refrain from performing an attachment procedure with the WWAN based on the second PDN connection as described above with reference to FIGS. 2 through 5. In certain examples, the operations of block 1525 may be performed by the WWAN attachment connection component as described with reference to FIGS. 7 and 8.

At block 1530, the UE 115 may establish a third PDN connection with the WWAN based on the second PDN connection as described above with reference to FIGS. 2 through 5. In certain examples, the operations of block 1530 may be performed by the WWAN internet connection component as described with reference to FIGS. 7 and 8.

Figure 16:
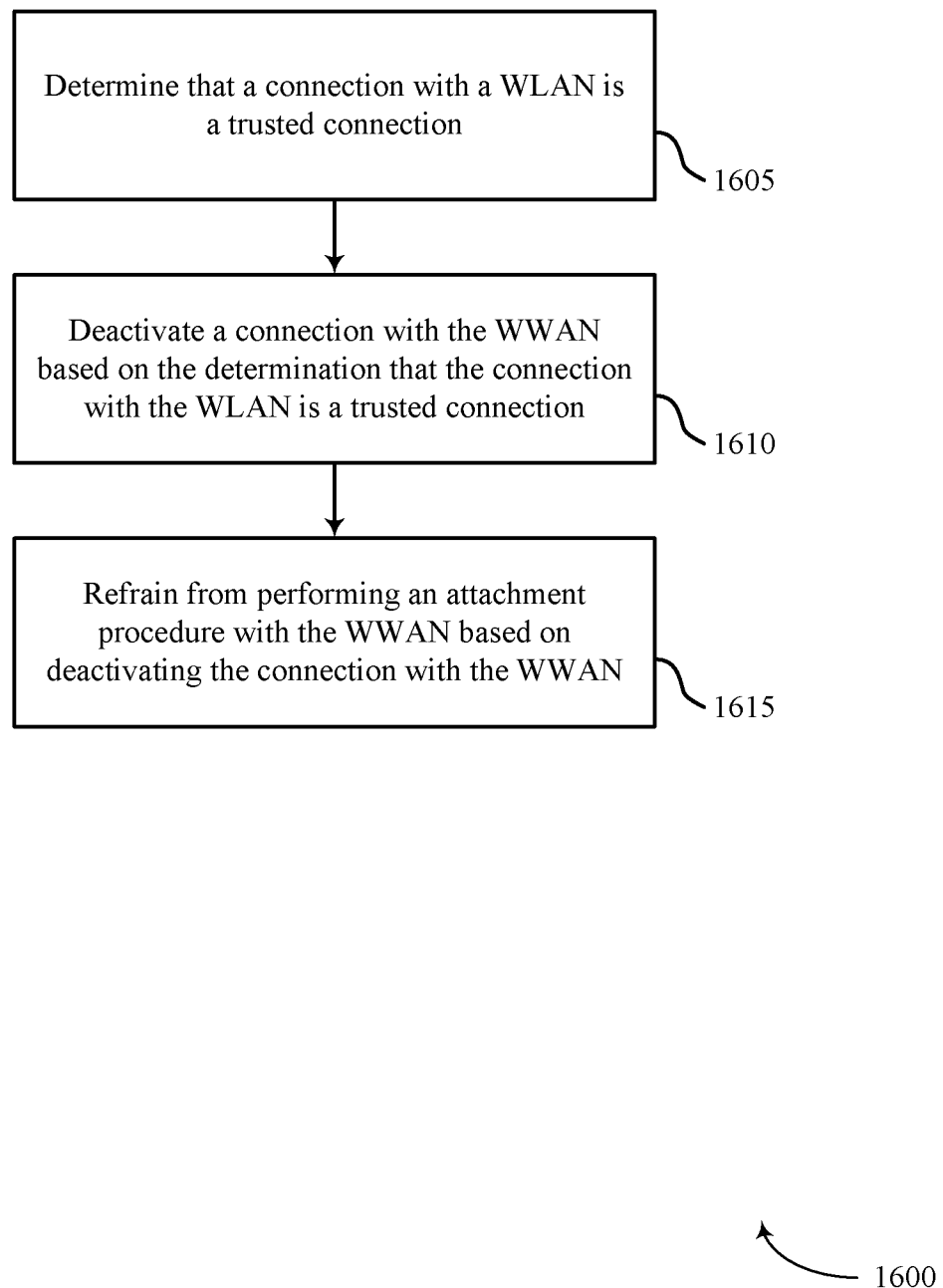

FIG. 16 shows a flowchart illustrating a method 1600 for efficient transition between a trusted WLAN and a WWAN in accordance with various aspects of the present disclosure. The operations of method 1600 may be implemented by a device such as a UE 115 or its components as described with reference to FIGS. 1 and 2. For example, the operations of method 1600 may be performed by the WWAN/WLAN transition manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may determine that a connection with a WLAN includes a trusted connection as described above with reference to FIGS. 2 through 5. In certain examples, the operations of block 1605 may be performed by the trusted connection component as described with reference to FIGS. 7 and 8.

At block 1610, the UE 115 may deactivate a connection with the WWAN based on the determination that the connection with the WLAN is a trusted connection as described above with reference to FIGS. 2 through 5. In certain examples, the operations of block 1610 may be performed by the connection deactivation component as described with reference to FIGS. 7 and 8.

At block 1615, the UE 115 may refrain from performing an attachment procedure with the WWAN based on deactivating the connection with the WWAN as described above with reference to FIGS. 2 through 5. In certain examples, the operations of block 1615 may be performed by the WWAN attachment connection component as described with reference to FIGS. 7 and 8.

Figure 17:
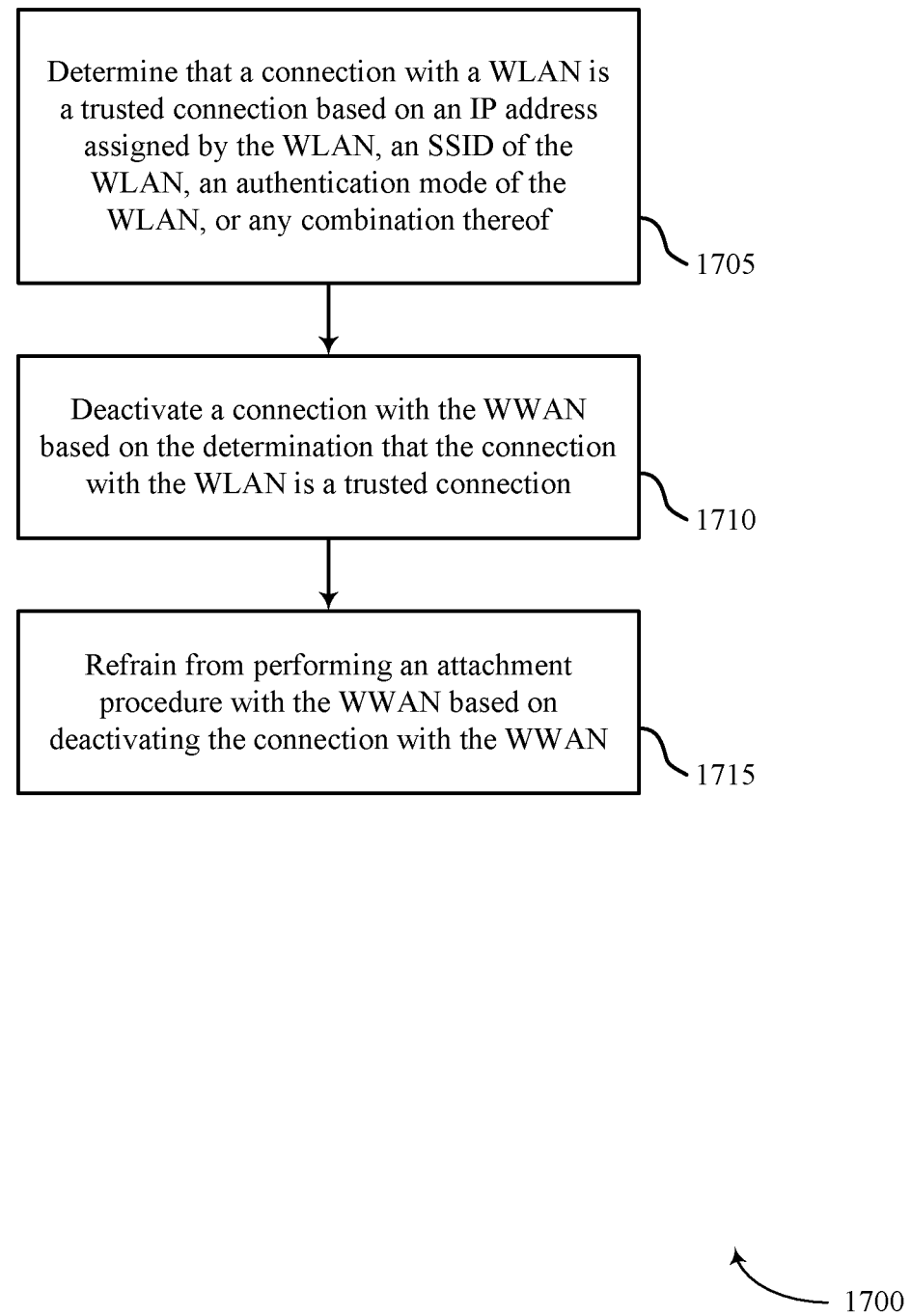

FIG. 17 shows a flowchart illustrating a method 1700 for efficient transition between a trusted WLAN and a WWAN in accordance with various aspects of the present disclosure. The operations of method 1700 may be implemented by a device such as a UE 115 or its components as described with reference to FIGS. 1 and 2. For example, the operations of method 1700 may be performed by the WWAN/WLAN transition manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may determine that the connection with the WLAN is a trusted connection is based on an IP address assigned by the WLAN, an SSID of the WLAN, an authentication mode of the WLAN, or any combination thereof as described above with reference to FIGS. 2 through 5. In certain examples, the operations of block 1705 may be performed by the trusted connection component as described with reference to FIGS. 7 and 8.

At block 1710, the UE 115 may deactivate a connection with the WWAN based on the determination that the connection with the WLAN is a trusted connection as described above with reference to FIGS. 2 through 5. In certain examples, the operations of block 1710 may be performed by the connection deactivation component as described with reference to FIGS. 7 and 8.

At block 1715, the UE 115 may refrain from performing an attachment procedure with the WWAN based on deactivating the connection with the WWAN as described above with reference to FIGS. 2 through 5. In certain examples, the operations of block 1715 may be performed by the WWAN attachment connection component as described with reference to FIGS. 7 and 8.

Figure 18:
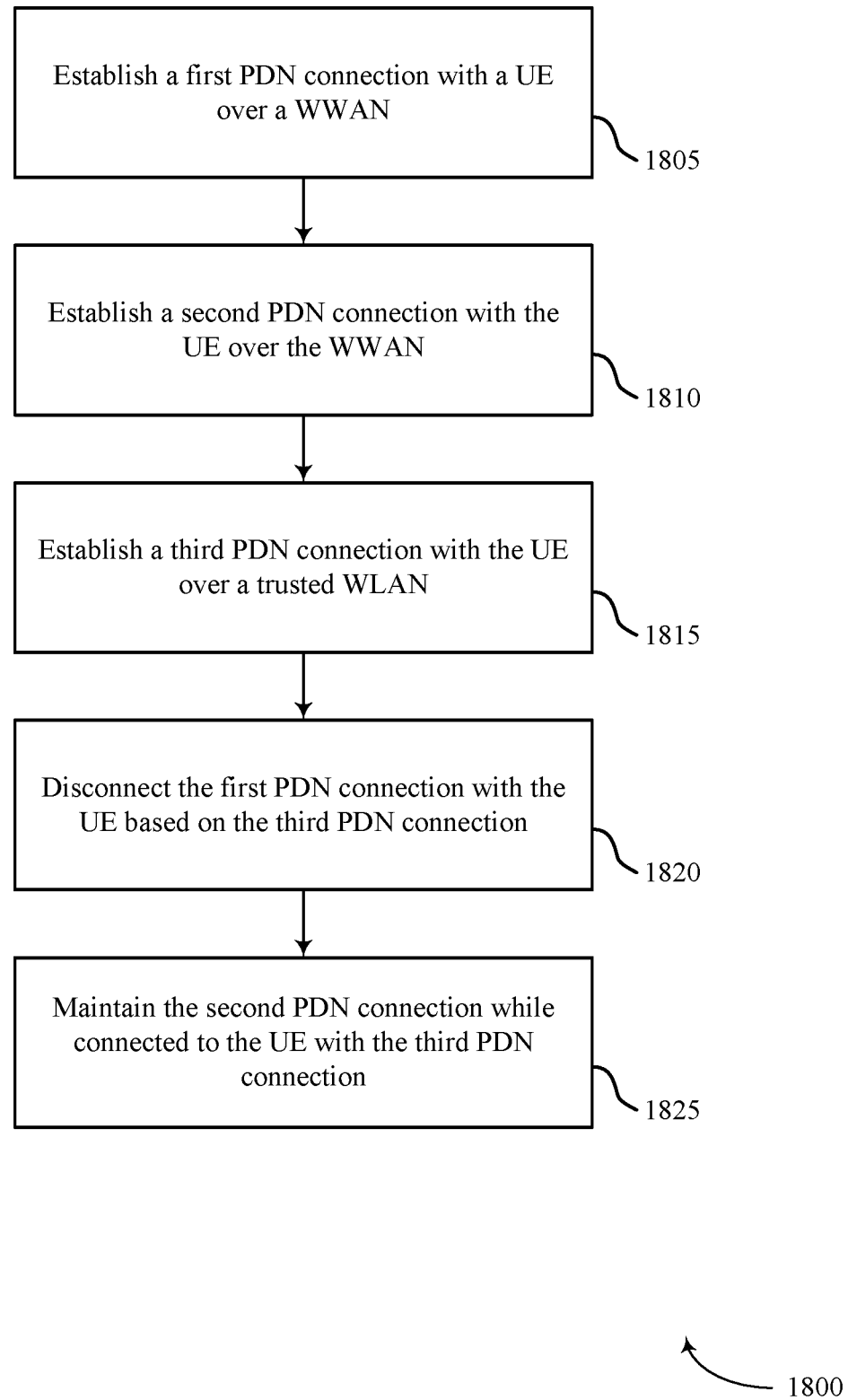

FIG. 18 shows a flowchart illustrating a method 1800 for efficient transition between a trusted WLAN and a WWAN in accordance with various aspects of the present disclosure. The operations of method 1800 may be implemented by a device such as a network device 210 or its components as described with reference to FIGS. 1 and 2. For example, the operations of method 1800 may be performed by the network WWAN/WLAN transition manager as described herein. In some examples, the network device 210 may execute a set of codes to control the functional elements of the device to perform the functions described below. Additionally or alternatively, the network device 210 may perform aspects the functions described below using special-purpose hardware.

At block 1805, the network device 210 may establish a first PDN connection with a UE over a WWAN as described above with reference to FIGS. 2 through 5. In certain examples, the operations of block 1805 may be performed by the WWAN internet connection component as described with reference to FIGS. 11 and 12.

At block 1810, the network device 210 may establish a second PDN connection with the UE over the WWAN as described above with reference to FIGS. 2 through 5. In certain examples, the operations of block 1810 may be performed by the WWAN attachment connection component as described with reference to FIGS. 11 and 12.

At block 1815, the network device 210 may establish a third PDN connection with the UE over a trusted WLAN as described above with reference to FIGS. 2 through 5. In certain examples, the operations of block 1815 may be performed by the trusted WLAN connection component as described with reference to FIGS. 11 and 12.

At block 1820, the network device 210 may disconnect the first PDN connection with the UE based on the third PDN connection as described above with reference to FIGS. 2 through 5. In certain examples, the operations of block 1820 may be performed by the WWAN internet connection component as described with reference to FIGS. 11 and 12.

At block 1825, the network device 210 may maintain the second PDN connection while connected to the UE with the third PDN connection as described above with reference to FIGS. 2 through 5. In certain examples, the operations of block 1825 may be performed by the WWAN attachment connection component as described with reference to FIGS. 11 and 12.

Figure 19:
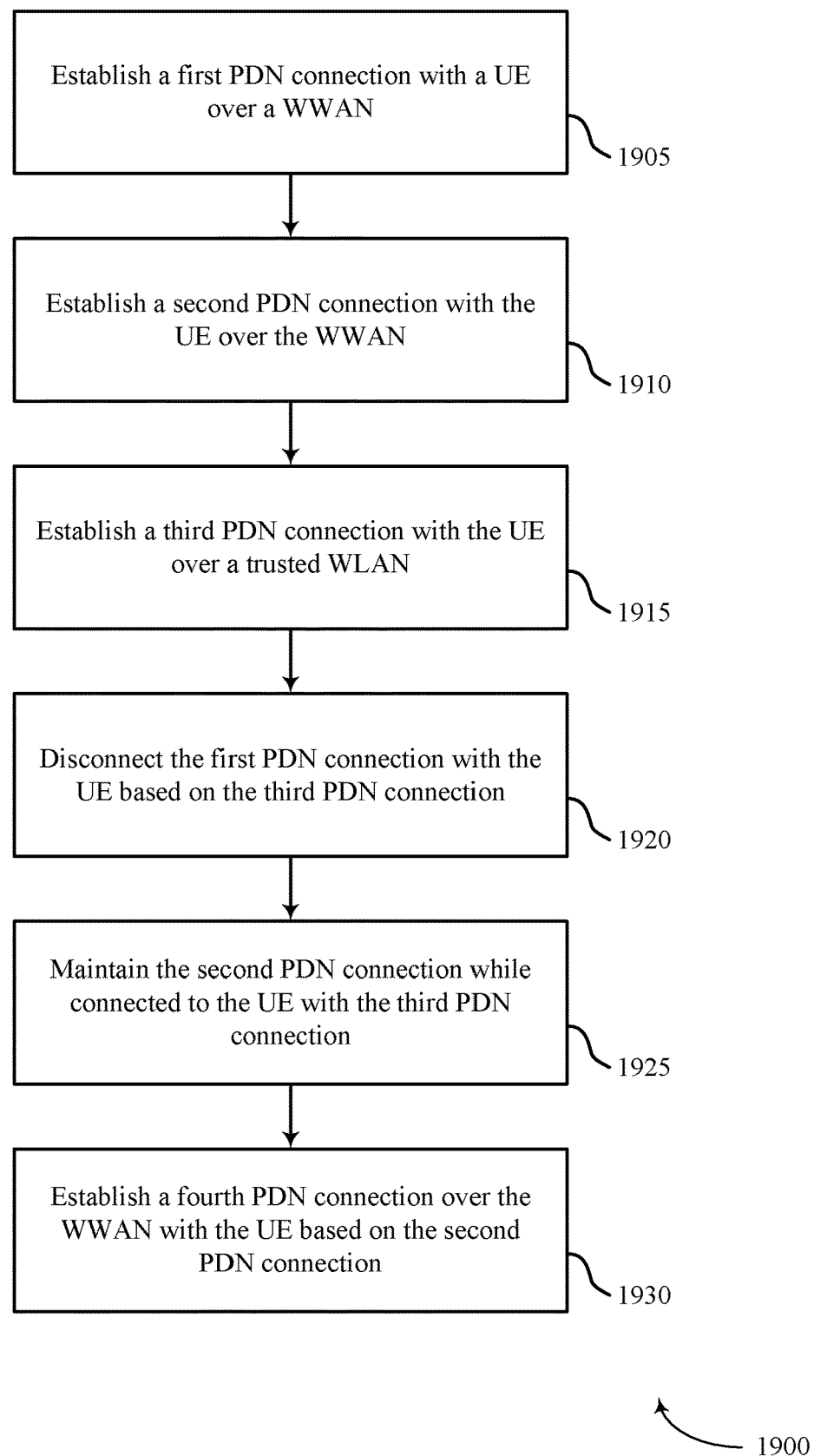

FIG. 19 shows a flowchart illustrating a method 1900 for efficient transition between a trusted WLAN and a WWAN in accordance with various aspects of the present disclosure. The operations of method 1900 may be implemented by a device such as a network device 210 or its components as described with reference to FIGS. 1 and 2. For example, the operations of method 1900 may be performed by the network WWAN/WLAN transition manager as described herein. In some examples, the network device 210 may execute a set of codes to control the functional elements of the device to perform the functions described below. Additionally or alternatively, the network device 210 may perform aspects the functions described below using special-purpose hardware.

At block 1905, the network device 210 may establish a first PDN connection with a UE over a WWAN as described above with reference to FIGS. 2 through 5. In certain examples, the operations of block 1905 may be performed by the WWAN internet connection component as described with reference to FIGS. 11 and 12.

At block 1910, the network device 210 may establish a second PDN connection with the UE over the WWAN as described above with reference to FIGS. 2 through 5. In certain examples, the operations of block 1910 may be performed by the WWAN attachment connection component as described with reference to FIGS. 11 and 12.

At block 1915, the network device 210 may establish a third PDN connection with the UE over a trusted WLAN as described above with reference to FIGS. 2 through 5. In certain examples, the operations of block 1915 may be performed by the trusted WLAN connection component as described with reference to FIGS. 11 and 12.

At block 1920, the network device 210 may disconnect the first PDN connection with the UE based on the third PDN connection as described above with reference to FIGS. 2 through 5. In certain examples, the operations of block 1920 may be performed by the WWAN internet connection component as described with reference to FIGS. 11 and 12.

At block 1925, the network device 210 may maintain the second PDN connection while connected to the UE with the third PDN connection as described above with reference to FIGS. 2 through 5. In certain examples, the operations of block 1925 may be performed by the WWAN attachment connection component as described with reference to FIGS. 11 and 12.

At block 1930, the network device 210 may establish a fourth PDN connection over the WWAN with the UE based on the second PDN connection as described above with reference to FIGS. 2 through 5. In certain examples, the operations of block 1930 may be performed by the WWAN internet connection component as described with reference to FIGS. 11 and 12.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for efficient transition between a trusted WLAN and a WWAN.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)).

An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include at least one carrier, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for efficient transition between a trusted WLAN and a WWAN. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, at least one microprocessor in conjunction with a DSP core, or any other such configuration). Thus, the functions described herein may be performed by other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by at least one general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a user equipment (UE) comprising:
    establishing a user-plane-traffic-free connection, wherein the user-plane-traffic-free connection terminates at a wireless wide area network (WWAN) network entity, and wherein a high level operating system (HLOS) of the UE is unaware of the user-plane-traffic-free connection;
    establishing a first packet data network (PDN) connection with the WWAN;
    establishing a connection with a wireless local area network (WLAN);
    determining the WLAN is a trusted WLAN based at least in part on the established connection with the WLAN;
    disconnecting the first PDN connection based at least in part on determining the WLAN is a trusted WLAN;
    maintaining the user-plane-traffic-free connection with the WWAN while connected to the WLAN;
    determining that the connection with the WLAN is unavailable; and
    responsive to determining that the connection with the WLAN is unavailable, establishing a second PDN connection with the WWAN based at least in part on the user-plane-traffic-free connection, wherein establishing the second PDN connection with the WWAN comprises refraining from performing an attachment procedure with the WWAN based at least in part on the maintained user-plane-traffic-free connection.

2. The method of claim 1, wherein the user-plane-traffic-free connection comprises an attachment PDN that terminates at the WWAN network entity.

3. The method of claim 1, wherein the user-plane-traffic-free connection comprises an internet protocol (IP) multimedia subsystem (IMS) connection.

4. The method of claim 3, further comprising:
    refraining from establishing an IMS connection with the WLAN based at least in part on the user-plane-traffic-free connection; and
    communicating using the IMS connection over the WWAN while connected to the WLAN.

5. The method of claim 1, further comprising:
    receiving a detach request from the WWAN based at least in part on the connection with the WLAN, wherein disconnecting the first PDN connection is based at least in part on the detach request.

6. The method of claim 1, wherein determining the WLAN is a trusted WLAN is based at least in part on an Internet protocol (IP) address associated with the WLAN, a service set identifier (SSID) associated with the WLAN, an authentication mode associated with the WLAN, or a combination thereof.

7. An apparatus for wireless communication at a user equipment (UE) comprising:

means for establishing a user-plane-traffic-free connection, wherein the user-plane-traffic-free connection terminates at a wireless wide area network (WWAN) network entity, and wherein a high level operating system (HLOS) of the UE is unaware of the user-plane-traffic-free connection;
means for establishing a first packet data network (PDN) connection with the WWAN;
means for establishing a connection with a wireless local area network (WLAN);
means for determining the WLAN is a trusted WLAN based at least in part on the established connection with the WLAN;
means for disconnecting the first PDN connection based at least in part on determining the WLAN is a trusted WLAN;
means for maintaining the user-plane-traffic-free connection with the WWAN while connected to the WLAN;
means for determining that the connection with the WLAN is unavailable; and
means for establishing, responsive to determining that the connection with the WLAN is unavailable, a second PDN connection with the WWAN based at least in part on the user-plane-traffic-free connection, wherein establishing the second PDN connection with the WWAN refrains from performing an attachment procedure with the WWAN based at least in part on the maintained user-plane-traffic-free connection.

8. An apparatus for wireless communication at a user equipment (UE), comprising:
a processor;
memory in electronic communication with the processor; and
instructions stored in the memory and operable, when executed by the processor, to cause the apparatus to:
establish a user-plane-traffic-free connection, wherein the user-plane-traffic-free connection terminates at a wireless wide area network (WWAN) network entity, and wherein a high level operating system (HLOS) of the UE is unaware of the user-plane-traffic-free connection;
establish a first packet data network (PDN) connection with the WWAN;
establish a connection with a wireless local area network (WLAN);
determine the WLAN is a trusted WLAN based at least in part on the established connection with the WLAN;
disconnect the first PDN connection based at least in part on determining the WLAN is a trusted WLAN;
maintain the user-plane-traffic-free connection with the WWAN while connected to the WLAN;
determine that the connection with the WLAN is unavailable; and
responsive to determining that the connection with the WLAN is unavailable, establish a second PDN connection with the WWAN based at least in part on the user-plane-traffic-free connection, wherein establishing the second PDN connection with the WWAN comprises refraining from performing an attachment procedure with the WWAN based at least in part on the maintained user-plane-traffic-free connection.

9. The apparatus of claim 8, wherein the user-plane-traffic-free connection comprises an attachment PDN that terminates at the WWAN network entity.

10. The apparatus of claim 8, wherein the user-plane-traffic-free connection comprises an internet protocol (IP) multimedia subsystem (IMS) connection.

11. The apparatus of claim 10, wherein the instructions are operable to cause the processor to:
refrain from establishing an IMS connection with the WLAN based at least in part on the user-plane-traffic-free connection; and
communicate using the IMS connection over the WWAN while connected to the WLAN.

12. The apparatus of claim 8, wherein the instructions are operable to cause the processor to:
receive a detach request from the WWAN based at least in part on the connection with the WLAN, wherein disconnecting the first PDN connection is based at least in part on the detach request.

13. A non-transitory computer-readable medium storing code for wireless communication at a user equipment (UE), the code comprising instructions executable to:
establish a user-plane-traffic-free connection, wherein the user-plane-traffic-free connection terminates at a wireless wide area network (WWAN) network entity, and wherein a high level operating system (HLOS) of the UE is unaware of the user-plane-traffic-free connection;
establish a first packet data network (PDN) connection with the WWAN;
establish a connection with a wireless local area network (WLAN);
determine the WLAN is a trusted WLAN based at least in part on the established connection with the WLAN;
disconnect the first PDN connection based at least in part on determining the WLAN is a trusted WLAN;
maintain the user-plane-traffic-free connection with the WWAN while connected to the WLAN;
determine that the connection with the WLAN is unavailable; and
responsive to determining that the connection with the WLAN is unavailable, establish a second PDN connection with the WWAN based at least in part on the user-plane-traffic-free connection, wherein establishing the second PDN connection with the WWAN comprises refraining from performing an attachment procedure with the WWAN based at least in part on the maintained user-plane-traffic-free connection.

14. The non-transitory computer-readable medium of claim 13, wherein the user-plane-traffic-free connection comprises an attachment PDN that terminates at the WWAN network entity.

15. The non-transitory computer-readable medium of claim 13, wherein the user-plane-traffic-free connection comprises an internet protocol (IP) multimedia subsystem (IMS) connection.

16. The non-transitory computer-readable medium of claim 15, wherein the instructions are further executable by the processor to:
refrain from establishing an IMS connection with the WLAN based at least in part on the user-plane-traffic-free connection; and
communicate using the IMS connection over the WWAN while connected to the WLAN.

17. The non-transitory computer-readable medium of claim 13, wherein the instructions are further executable by the processor to:
receive a detach request from the WWAN based at least in part on the connection with the WLAN, wherein disconnecting the first PDN connection is based at least in part on the detach request.

\* \* \* \* \*